United States Patent
Locke et al.

(10) Patent No.: US 10,558,917 B2
(45) Date of Patent: Feb. 11, 2020

(54) ARTIFICIAL INTELLIGENCE AND NATURAL LANGUAGE PROCESSING BASED BUILDING AND FIRE SYSTEMS MANAGEMENT SYSTEM

(71) Applicant: Tyco Fire & Security GmbH, Neuhausen am Rheinfall (CH)

(72) Inventors: Robert Locke, Sonoma, CA (US); Andreas Brenner, Hoehenkirchen (DE); Paul Rasband, Fremont, CA (US); Hubert A. Patterson, Boca Raton, CA (US)

(73) Assignee: Tyco Fire & Security GmbH, Neuhausen Am Rheinfall (CH)

( * ) Notice: Subject to any disclaimer, the term of this patent is extended or adjusted under 35 U.S.C. 154(b) by 264 days.

(21) Appl. No.: 15/492,820

(22) Filed: Apr. 20, 2017

(65) Prior Publication Data

US 2018/0308475 A1    Oct. 25, 2018

(51) Int. Cl.
| | |
|---|---|
| *G10L 15/00* | (2013.01) |
| *G06N 5/02* | (2006.01) |
| *G06F 17/27* | (2006.01) |
| *G05B 15/02* | (2006.01) |
| *G08B 25/08* | (2006.01) |
| G08B 17/00 | (2006.01) |
| G10L 25/48 | (2013.01) |
| G10L 17/00 | (2013.01) |
| G06N 20/00 | (2019.01) |

(52) U.S. Cl.
CPC ............. *G06N 5/02* (2013.01); *G05B 15/02* (2013.01); *G06F 17/2765* (2013.01); *G08B 25/08* (2013.01); G05B 2219/2642 (2013.01); G06N 20/00 (2019.01); G08B 17/00 (2013.01); G10L 15/00 (2013.01); G10L 17/00 (2013.01); G10L 25/48 (2013.01)

(58) Field of Classification Search
CPC ....... G08B 13/00; G08B 13/194; G10L 15/00; G10L 17/26
USPC .......................................................... 704/275
See application file for complete search history.

(56) References Cited

U.S. PATENT DOCUMENTS

2005/0254505 A1* 11/2005 Chang ..................... H04L 67/12
                                                                                                                370/401
2018/0302730 A1* 10/2018 Liu .......................... G10L 25/51

FOREIGN PATENT DOCUMENTS

WO    WO-2015191722 A1 * 12/2015 ............. G08B 13/04

* cited by examiner

*Primary Examiner* — Daniel Abebe
(74) *Attorney, Agent, or Firm* — HoustonHogle LLP

(57) ABSTRACT

A system and method for detecting speech from occupants in a building management system is disclosed. Building management systems include fire alarm systems, building automation systems and security systems, in examples. Installed devices deployed within the building include audio transducers that detect speech from the occupants, and a management system panel processes the information from the installed devices and processes the detected speech from the occupants. In a fire alarm system, in one example, the fire alarm panel processes the detected speech from fire sensor devices and alarm notification devices as the installed devices. The fire alarm panel and/or its installed devices can identify commands from the detected speech for controlling and testing the fire alarm management system. In embodiments, Artificial Intelligence (AI) subsystems can be further added to the building management systems for control and information services.

25 Claims, 14 Drawing Sheets

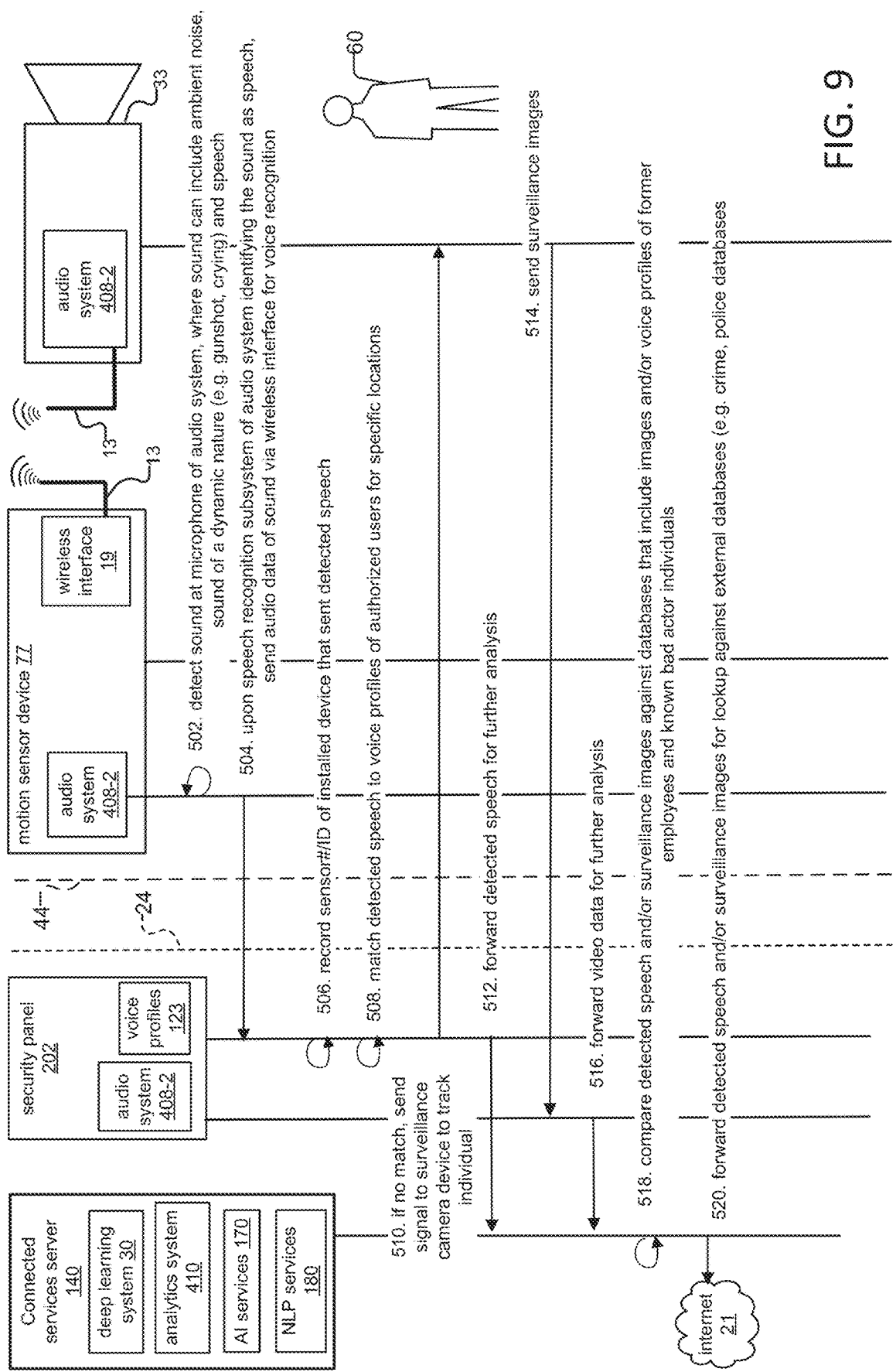

ARTIFICIAL INTELLIGENCE AND NATURAL LANGUAGE PROCESSING BASED BUILDING AND FIRE SYSTEMS MANAGEMENT SYSTEM

BACKGROUND OF THE INVENTION

Building management systems such as building automation systems, fire alarm systems and security systems are often installed within a premises such as commercial, residential, or governmental buildings. Examples of these buildings include offices, hospitals, warehouses, schools or universities, shopping malls, government offices, and casinos.

Building management systems usually include a panel installed on a wall in a secure location. The panel typically receives information from and/or provide control to slaved devices that are deployed around the building. The devices include sensors, controllers, and/or hybrid sensor/controllers. Via these devices, the building management systems monitor for and react to changes in the physical environment within or around the building and/or to the building itself, and control and monitor the mechanical and electrical equipment of the building such as ventilation, lighting, and power systems, in examples.

These traditional building management systems typically rely on one of two types of network communications. Some utilize low-bandwidth/high latency serial communications links to provide high reliability for communications between the deployed slave devices and the panels. The devices are also usually addressable. Communication between the panels and the devices is most often executed in a master-slave/controller-peripheral fashion, where the panel can poll the devices. In other cases, the communication between the panel and the devices is layered onto the buildings internet protocol local area network.

Building automation systems include one or more building automation control panels and devices that control and monitor the physical plant aspects of a building and aspects of business-specific electrical, computer, and mechanical systems. The physical plant typically includes heating, ventilation, and air conditioning (HVAC) systems, elevators/escalators, lighting and power systems, refrigeration and coolant systems, and air and/or water purification systems, in examples. Business-specific systems include computer systems, manufacturing systems that include various types of computer-aided machinery and test equipment, and inventory control and tracking systems, in examples.

Security systems include security panels and security devices, where the security devices detect intrusions and unauthorized access at or within the building and report indications thereof to the security panel. The security devices of the security systems include motion sensor devices, surveillance camera devices, and door controllers that communicate with the security panel over a security network. Motion sensor devices can detect intrusions and unauthorized access to the premises, and send indications of the intrusions to the security panel. The surveillance camera devices capture video data of monitored areas within the premises, and door controllers provide access to perimeter and/or internal doors, in examples.

The fire alarm systems typically include fire alarm devices deployed within the buildings that are directly wired to a fire alarm panel, although wireless systems are becoming more common. The fire alarm devices of the fire alarm systems typically include fire sensor devices and alarm notification devices. The fire sensor devices detect indications of fire such as heat, smoke, flame, and carbon monoxide, in examples, and send signals to the fire alarm panel in response. Upon receiving signals indicative of fire from the fire sensor devices, the fire alarm panel sends alarm signals to the alarm notification devices such as sirens and strobe lights to alert occupants of the building, and contacts a central station via legacy telephone systems to alert emergency responders such as fire and police, in examples. A display screen of the fire alarm panel typically provides an indication of which fire sensor device(s) triggered the generation of the alarm signals. The fire alarm devices of the fire alarm management systems can also include manual alarm signaling devices such as pull stations or panic buttons. An individual pulls a lever (of the pull station) or presses a button (of the panic button) in response to detecting fire or other emergency, and in response, the manual alarm signaling device sends a signal to the fire alarm and/or security panels. As with the fire sensor devices, upon receiving the signal indicative of fire from the manual alarm signaling device, the fire alarm panels send alarm signals to the alarm notification devices and contacts the central station.

SUMMARY OF THE INVENTION

Speech and voice recognition capabilities are increasingly being implemented in many different types of products to interact with and to control the products. Examples of products that include speech and voice recognition capabilities include automobiles, mobile phones, and computer workstations, in examples. Voice and speech recognition improves a user's ability to interact with a product or device by allowing a user to more naturally indicate the operation that is desired.

At the same time, intelligent personal assistant technology is becoming ubiquitous. These artificial intelligence (AI) systems are capable of voice interaction, voice control and can provide real time information and enable nature language control for home automation systems. Most system allow activation using a wake-word, whereas others require the user to push a button.

It would be beneficial to integrate speech commands and AI into building management systems. Building management systems such as fire alarm systems, building automation systems, and security systems typically include installed devices deployed in a building that generate information and a management system panel that processes the information generated from the installed devices. It would be desirable to incorporate voice and speech recognition capabilities into the installed devices to make the fire alarm system more interactive. In one example, personnel such as technicians can use speech commands to execute tests upon the installed devices and the fire alarm panel. Additionally, the installed devices can determine audio clues from occupants of the premises that indicate that a fire or other emergency situation is occurring, and the fire alarm panel can act upon the determined audio clues.

In general, according to one aspect, the invention features a building management system, e.g., fire alarm system or security system. The building management system includes installed devices deployed in a building that generate information and a management system panel. The installed devices include audio transducers for detecting speech from building occupants, and the management system panel processes the information from the installed devices and processes the detected speech from the occupants.

AI subsystems can be further added for control and information services.

In one embodiment, the installed devices include fire sensor devices, manual alarm signaling devices, and alarm notification devices and the management system panel is a fire alarm panel. For this embodiment, the generated information includes the detection of smoke, heat, and/or flames.

In another embodiment, the installed devices include motion sensor devices, surveillance camera devices, and/or door controller devices and the management system panel is a security panel. For this embodiment, the generated information includes detected motion and detected surveillance images.

In yet another embodiment, the installed devices include thermostats, lighting systems, and power control units and the management system panel is a building automation control panel.

Typically, the management system panel of the different embodiments communicates with a connected services server. Additionally, the management system panel preferably includes an audio system including a speech recognition subsystem and a voice recognition subsystem.

The installed devices of the different embodiments report back the generated information via a wired network interface and report back the detected speech via a different network interface. Preferably, the different network interface is a wireless network.

The management system panel can analyze the detected speech from the installed devices and maintains presence information indicating rooms of the building containing occupants. It can also alternatively or additionally analyze the detected speech from the installed devices and maintains counts of occupants in the rooms of the building.

The management system panel preferably generates building alarms in response to the detected speech and analyzes the detected speech and performs voice recognition against a list of known speakers to identify the speaker. For example, the panel can analyze the detected speech for commands from a technician concerning a test of the building management system and perform voice analysis to confirm the identity of the technician.

In general, according to another aspect, the invention features a method of operation of a building management system. Information is generated at installed devices for the building management system. Speech is also detected at the installed devices via audio transducers. A panel can process the information from the installed devices and process the detected speech from the occupants at the management system panel.

In an embodiment, the building management system panel can optionally communicate the detected speech to a remote connected services server.

In general, according to yet another aspect, the invention features a building automation system. The building automation system includes installed devices deployed in a building that generate information, and a management system panel. The installed devices include audio transducers for detecting speech from building occupants, and the management system panel processes the information from the installed devices and processes the detected speech from the occupants.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 9 is a sequence diagram showing a "soft access control" feature associated with the security system of FIG. 4, where the system can determine that a controlled area

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
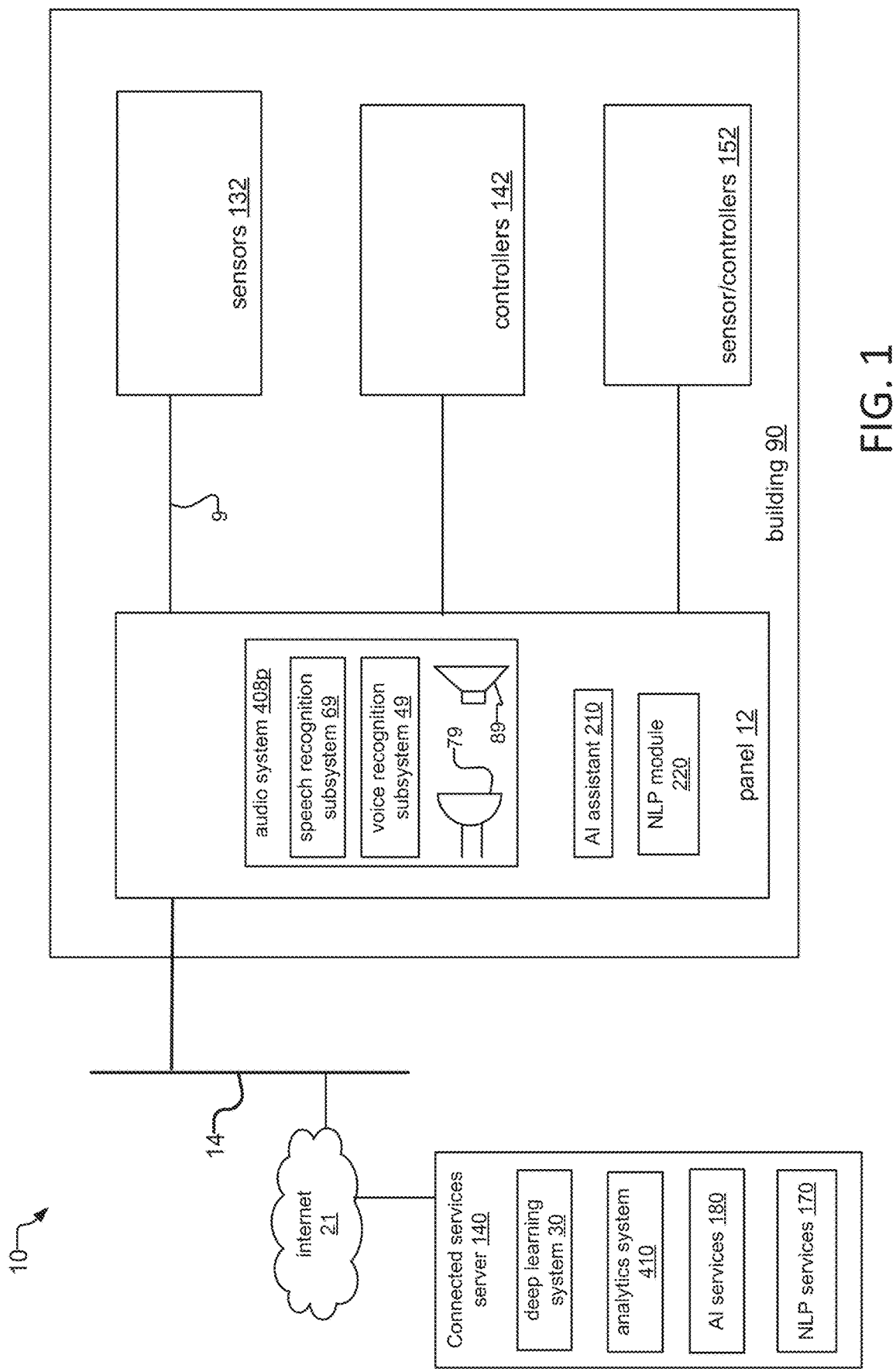
FIG. 1 is a block diagram showing the general arrangement of a building management system including a panel and deployed sensors, controllers, and sensor/controller devices.

FIG. 1 shows a general arrangement of a building management system 10. The building management system 10 includes a panel 12 and devices deployed at, around, and/or within a building 90 such as sensors 132, controllers 142, and sensor/controllers 152. The panel 12 connects to a remote a connected services server 140 over the Internet 21 via a local area network 14.

Sensors 132 detect changes to the physical environment within or around a building 90 and changes to mechanical and electrical equipment within the building 90, in examples. The sensors 132 also react to the detected changes in some way, such as by sounding a siren or sending an indication of the detected changes to the panel 12. Sensors 132 typically send indications such as coded electrical signals or data packets over communication links 9 to the panel 12, where the coded electrical signals and/or data packets convey information that is specific to the detected change.

Controllers 142 act upon the indications of the detected changes that the sensors send to the panel 12 such as by actuating or controlling machinery and/or generate a notification to occupants. In response to receiving the indications of the detected changes from the sensors 132 over the communication links 9, the panel 12 sends associated signals/messages to the controllers 142 over the link, which can be the same links as that used between the panel 12 and the sensors 132 or different links.

In response to receiving the signals/messages from the panel 12, the controllers 142 might generate a notification such as activating an audible siren or visible strobe, and/or execute actions upon the various computer, electrical, and/or mechanical systems controlled by the controllers 142. In one example, a door controller of a security system can lock all doors which it controls in response to receiving a message from a security panel indicating that an intrusion was detected by one or more motion detector sensors. In another example, an equipment controller of a building automation system can send signals to actuators that shut off the flow of both electricity and coolant water to machinery in a manufacturing facility. The equipment controller would execute this action in response to receiving a message from a building automation control panel indicating that seismic activity beyond an acceptable threshold was detected by an earthquake sensor, in one example.

Sensor/controllers 152 combine the functions of the sensor 132 and controller 142 devices and have additional capabilities. As with sensors 132, the sensor/controllers 152 detect changes and send indications of these changes over links 9 to the panel 12. As with the controllers 142, the sensor/controllers 152 can execute actions in response to receiving signals/messages over the links 9 from the panel 12.

Unlike the sensor 132 and controller 142 devices, however, the sensor/controllers 152 can also directly execute actions in response to detecting changes. In one example, for a building automation system, an occupancy sensor/controller 152 mounted on a wall within a room of a building includes a motion sensor and controls lighting within the room. In response to the occupancy sensor/controller detecting motion (or absence of motion over a time period) within the room, the occupancy sensor/controller 152 not only sends an indication to this effect to a building automation control panel, but can also turn on (turn off) the lighting within the room directly. In this example, the indication received by the building automation control panel is not "wasted"; rather, the building automation control panel can use this information to determine a profile or history of room usage, in one example.

In the following embodiments, the installed devices 132, 142, 152 of the building management system include at least audio transducers 79 for detecting speech from building occupants. They can further include speakers 89 for providing audio information to those occupants. The management system panel 12 processes the information from the installed devices and processes the detected speech from the occupants. After processing the detected speech, the panel 12 can execute various actions upon the installed devices 132/142/152 and/or upon various systems including mechanical and electrical equipment in response.

The panel 12 also includes an audio system 408p, a Natural Language Processing (NLP) Module 220, and an Artificial Intelligence (AI) assistant 210. The audio system 408p includes a speech recognition system 69, a voice recognition system 49, an audio transducer (e.g. microphone) 79, and a speaker 89. The connected services server 140 includes a deep learning system 30, an analytics system 410, AI services, and NLP services 180.

Just as the audio-enabled installed devices 132, 142, 152 enable occupants to issue speech/voice commands at the individual devices, the audio system 408p of the panel 12 enables occupants to issue speech commands at the panel 12. The audio system 408p typically converts the words of the detected speech to text for consumption and further analysis by the NLP agent 230.

The NLP agent 230 provides initial processing of the text sequence of words by comparing the words to a list of locally maintained commands, where local commands are typically simple commands having a sequence of only a few words. The NLP agent 23 sends any text speech not matching a local command to the NLP services 180 over the internet 21 via the LAN 14 to parse the words into sentences and analyze syntax and context, such as whether a word is a noun or a verb. The NLP services 180 returns a list of (remote) commands matching the speech text.

The NLP agent 23 then passes any matching commands to the AI assistant 240. The AI assistant 240, in turn, executes the matching local commands directly upon local resources and/or components of the panel 12, and sends the matching remote commands for execution by the AI services 170. The AI services 170 can then execute actions associated with the matching remote commands upon sensors 132, controllers 142, sensor/controllers 152, and/or upon various systems including mechanical and electrical equipment of the building 90 in response. The speech text can also be passed as input to the voice recognition subsystem 49 to possibly determine which specific individual issued the speech.

Figure 2A:
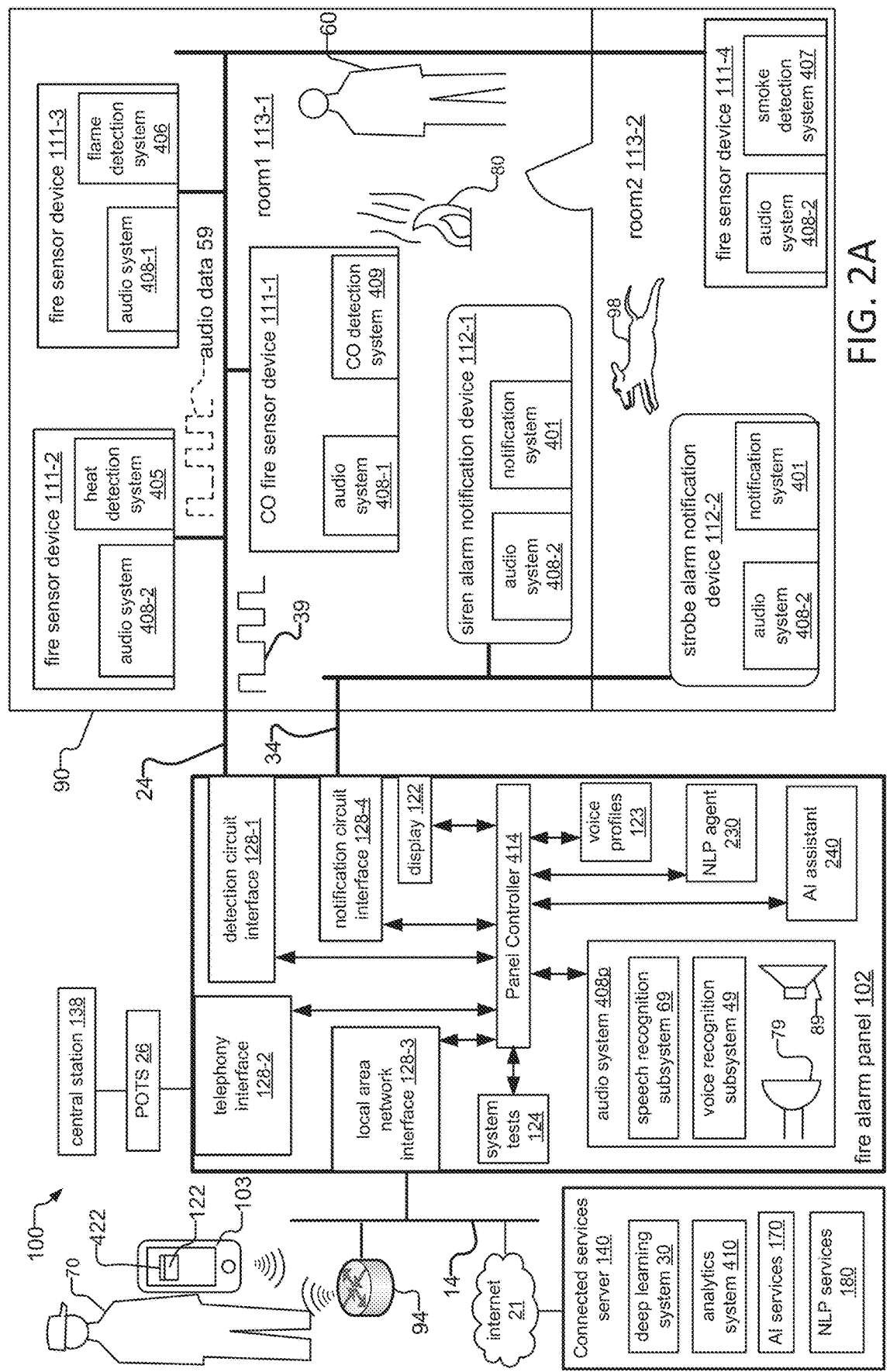
FIG. 2A is a block diagram showing an embodiment of an audio-enabled fire alarm system for a building, where the system includes audio-enabled fire alarm devices such as fire sensor devices and alarm notification devices as installed devices that communicate with a fire alarm panel.

FIG. 2A is a block diagram showing an embodiment of an audio-enabled fire alarm system 100 at a building 90. The fire alarm system 100 includes a fire alarm panel 102 as a management system panel and installed devices deployed within the building 90 such as fire sensor devices 111 (which are examples of sensors 132 as shown in FIG. 1) and alarm notification devices 112 (which are examples of controllers 142 as shown in FIG. 1). The fire alarm system 100 also includes a connected services server 140. The connected services server 140 includes a deep learning system 30 and an analytics system 410. An enterprise network 14 such as a local area network (LAN) connects the fire alarm panel 102 to the internet 21, the latter of which provides a communications path between fire alarm panel 102 and the connected services server 140, in one example.

Exemplary fire sensor devices 111-1, 111-2, 111-3, and 111-4 are shown. Exemplary alarm notification devices 112-1 and 112-2 are also shown. Fire sensor device 111-1 through 111-3 and alarm notification device 112-1 are deployed within room1 113-1 of the building 90. In a similar vein, fire sensor device 111-4 and alarm notification device 1 12-2 are deployed within room2 113-2. An occupant such as an individual 60 is within room1 113-1 and a dog 98 is within room2 113-2.

Each of the fire sensor devices 111 include a fire detection system and an audio system 408. The alarm notification devices 112 include a notification system 401 and an audio system 408. The fire sensor devices 111 and the alarm notification devices 112 detect speech from building occupants via the audio systems 408 of the devices. Fire sensor devices 111-1 and 111-3 include audio system 408-1. Siren alarm notification device 112-1 and strobe alarm notification device 112-2 include audio system 408-2, and fire sensor devices 111-2 and 111-4 also include audio systems 408-2.

The fire sensor devices 111-1 through 111-4 generate information such as the presence of indications of fire 80. For this purpose, the fire sensor devices 111 include fire detection systems, which in turn include one or more different types of sensors. In examples, CO fire sensor device 111-1 includes a Carbon Monoxide (CO) detection system 409 that monitors for CO as an indication of fire; heat fire sensor device 111-2 includes a heat detection system 405 which typically includes a thermistor that monitors for heat; flame fire sensor device 111-3 includes a flame detection system 406 which includes an optical sensor, an ultraviolet sensor, and/or an infrared (IR) sensor that monitor for flames; and smoke fire sensor device 111-4 includes a smoke detection system 407 which includes a photoelectric sensor that monitors for smoke. Alternatively, it can also be appreciated that the fire detection systems of the fire sensor devices 111 can include multiple sensors of different types to improve their ability to detect indications of fire.

A heat fire sensor device 111-2 such as a "smart" sprinkler head can use a thermistor as its heat detection system 406 or a glass bulb full of glycerin liquid, which shatters when hot, as its heat detection system 406. In response to detecting heat, the smart sprinkler head releases water (or other fire suppression agent) and also generates a signal indicative of fire to the fire alarm panel 102.

The fire alarm panel 102 includes interfaces 128, a panel controller 414, a display 122 such as a touch screen display, system tests 124, voice profiles 123, and an audio system 408-p. Detail for the audio system 408-p is also shown. Specifically, audio system 408-p includes a speech recognition system 69, a voice recognition system 49, an audio transducer (e.g. microphone 79), and a speaker 89.

The panel controller 414 controls the audio system 408-p, provides access to the system tests 124 and the voice profiles 123, and controls the interfaces 128. The interfaces include a detection circuit interface 128-1, a telephony interface 128-2, a local area network interface 128-3, and a notification circuit interface 128-4.

The detection circuit interface 128-1 enables communications between the fire alarm panel 102 and its fire sensor devices 111 on a detection circuit (loop) 24. In a similar vein, the notification circuit interface 128-4 enables communications between the fire alarm panel 102 and alarm notification devices 112 on a notification circuit 34.

Interface 128-2 provides, in one example, a dedicated telephone line to a circuit switched telephone system such as a Plain Old Telephone Service (POTS) 26. The POTS 26 connects to a central station 138 for contacting first responders in the event of an emergency, such as when an indication of fire 80 is detected within the premises 90 by the fire sensor devices 111.

Interface 128-3 enables communications between the fire alarm panel 102 and a local area network 14 such as an Ethernet network. The local area network 14 includes devices that communicate via standard protocols such as IP and/or proprietary protocols. The local area network 14 includes a wireless access point 94 and provides communications to a remote network such as the internet 21. The wireless access point 94 provides a wireless network that enables communications between the local area network 14 and mobile user devices 103 carried by operators 70.

The user devices 103 communicate over the wireless network via wireless protocols such as WiFi and Bluetooth, in examples. Examples of user devices 103 include mobile phones and tablet/phablets. User devices 103 include a display screen 122 and an application 422 that executes on the user device 103 for accessing and and/or configuring the fire alarm panel 102 and the fire alarm devices. The application 422 displays information on the display screen 122 that enables the operator 70 to interact with the application 422 for management and configuration of the components of the fire alarm system 100.

The display 122 displays information concerning the fire alarm system 100. In examples, this information includes the operational state and/or status of the fire alarm devices and the fire alarm panel 102 and the locations of the fire alarm devices within the building 90. In one implementation, the display 122 presents a user interface that enables interactive selection, configuration, and display of the components of the fire alarm system 100. In one example, the user interface is a graphical user interface (GUI).

In one implementation, the fire sensor devices 111 and the alarm notification devices 112 are hardwired to their respective circuits 24/34 in a loop or hub and spoke configuration. Loop configurations are common and easy to install. Hub and spoke configurations or star topologies are not susceptible to signal interference or tampering that can disable or interrupt functioning of wireless fire alarm systems. The hub and spoke configuration also allows a homeowner or service technician/operator 70 to test and control each device independently from the fire alarm panel 102 for maximum flexibility and ease of troubleshooting. In one implementation, the fire alarm devices communicate over their respective loops or links 24/34 with the fire alarm control panel 102 via standard serial protocols such as RS-232, RS422/RS-485, Modbus, Wiegand, and/or proprietary messaging and signaling protocols, in examples. In another implementation, the fire alarm devices are internet protocol (IP) enabled devices.

The fire alarm sensors 111, in one example, transmit information over the detection circuit 24 for reporting back to the fire alarm panel 102. In examples, the generated information 39 includes the detection indication of fire such as smoke levels, heat (temperature) levels, and/or presence of flames.

The fire sensors 111 and the alarm notification devices 112 detect the speech of occupants 60 including technicians 70 and report back the detected speech 59 to the fire alarm panel 102 via the detection circuit 24/notification circuit 34.

Figure 2B:
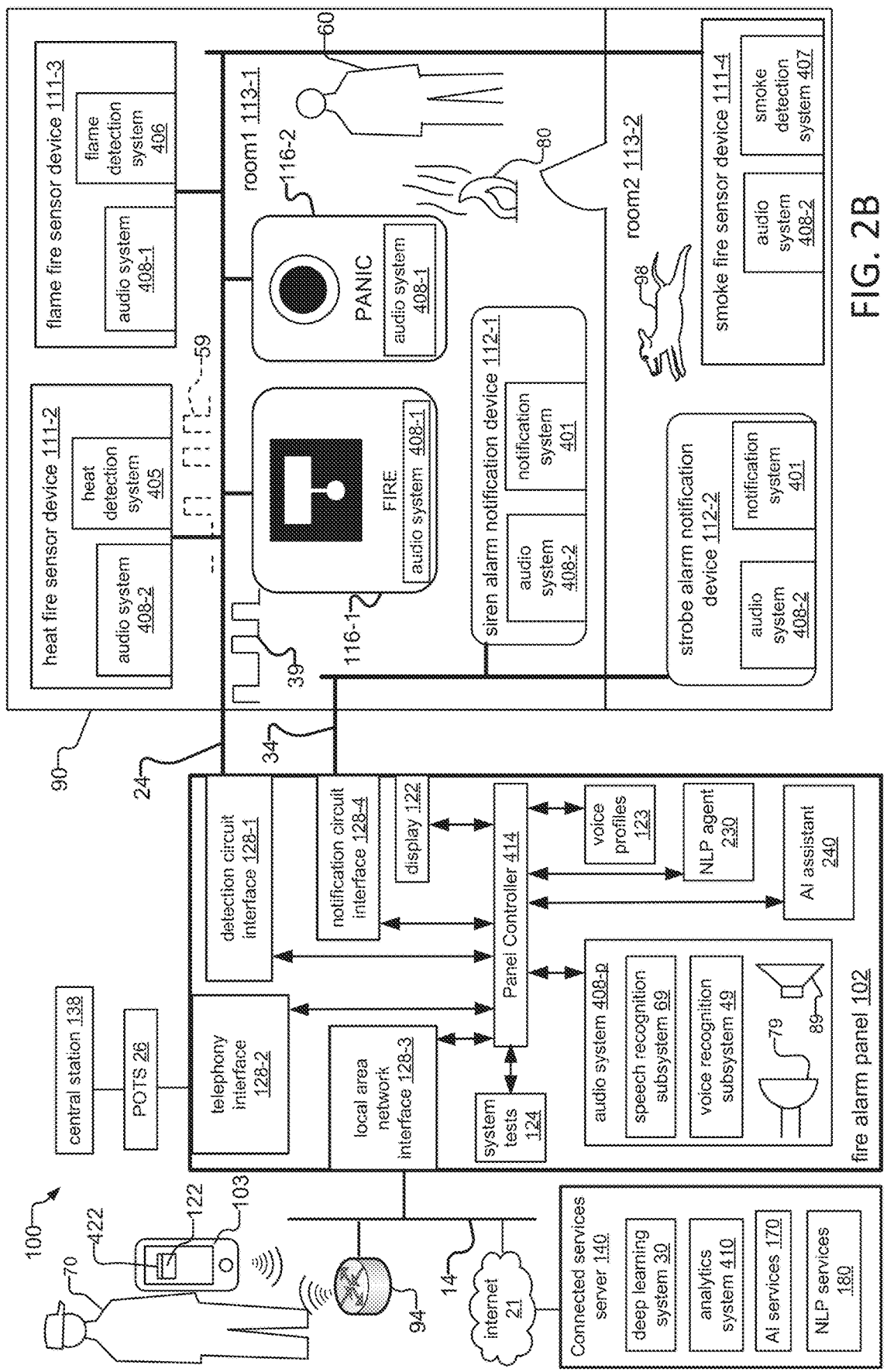
FIG. 2B is a block diagram showing another embodiment of an audio-enabled fire alarm system for a building, where the system includes audio-enabled fire alarm devices such as fire sensor devices, manual alarm signaling devices, and alarm notification devices as installed devices that communicate with the fire alarm panel.

In a preferred implementation, all of the installed devices (e.g. fire sensor devices 111 and alarm notification devices 113) continuously monitor for sounds such as ambient noise and speech of occupants 60 via the audio systems 408 of the installed devices. In another implementation, only some of the installed devices continuously monitor for sounds such as screams, gunshots or breaking glass, while the other installed devices place their audio systems 408 in an initially disabled or "sleep" mode. Upon receiving an alarm signal sent from the fire alarm panel 102, the other installed devices enable their audio systems 408. FIG. 2B is a block diagram showing another embodiment of an audio-enabled fire alarm system 100 at a building 90. The fire alarm system 100 includes a fire alarm panel 102 as a management system panel and installed devices deployed within the building 90 such as fire sensor devices 111 (sensors 132), manual alarm signaling devices 116 (another example of sensor 132), and alarm notification devices 112 (which are examples of controllers 142 as shown in FIG. 1).

Specifically, the system of FIG. 2B includes similar components as in FIG. 2A, with the exception that the CO fire sensor device 111-1 is removed from the system of FIG. 2B and has been replaced with a pull station manual signaling device 116-1 and a panic button manual signaling device 116-2. The pull station manual signaling device 116-1 and the panic button manual signaling device 116-2 each include an audio system 408-1.

Figure 2C:
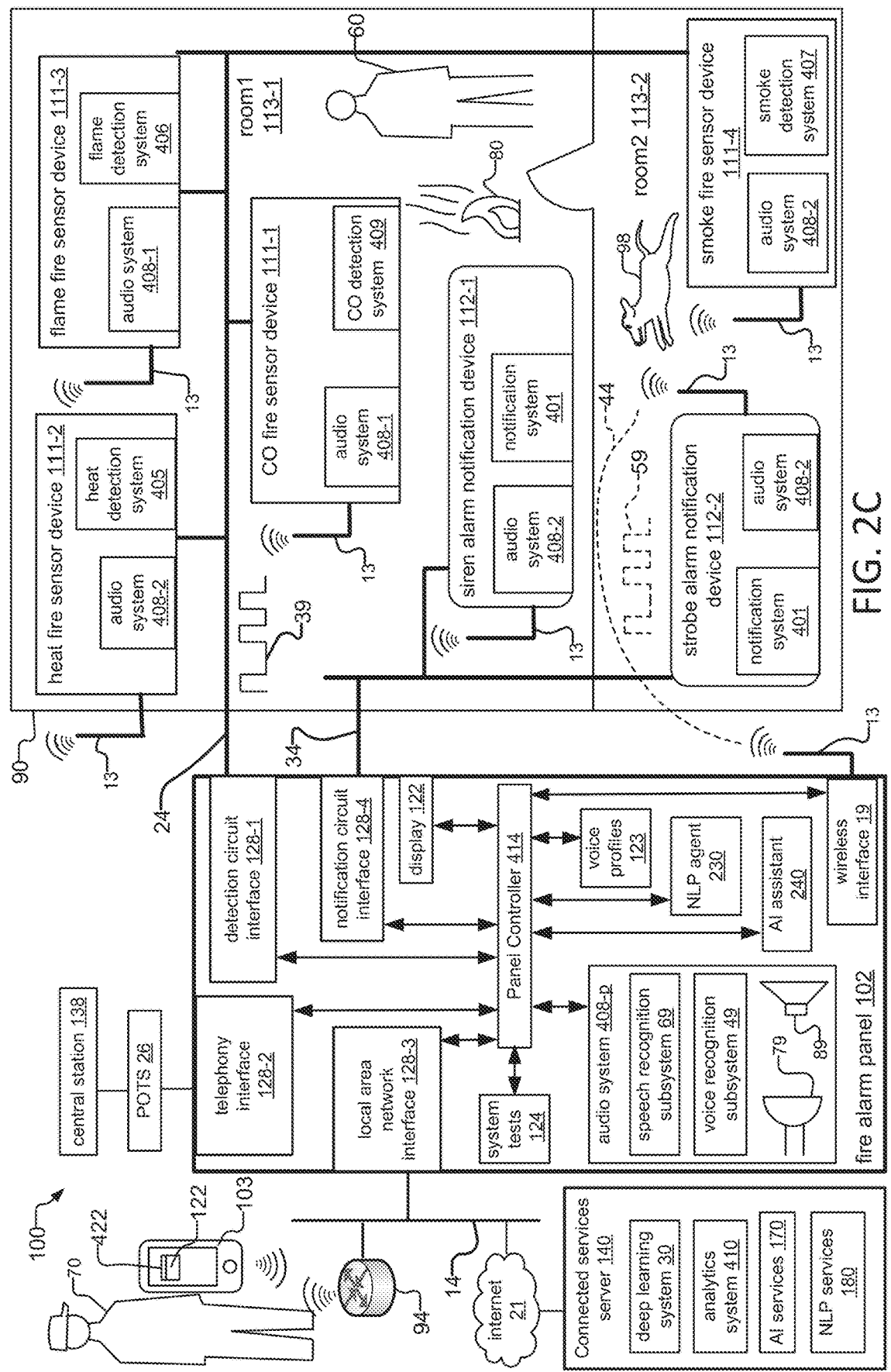
FIG. 2C is a block diagram showing another embodiment of an audio-enabled fire alarm system in which audio information is transmitted over wireless interfaces.

FIG. 2C is a block diagram showing another embodiment of an audio-enabled fire alarm system 100. The system in FIG. 2C includes similar components as in FIG. 2A. As in FIG. 2A, each of the installed devices such as the fire sensor devices 111/alarm notification devices 112 include an audio system 408 for detecting speech.

Unlike the system of FIG. 2A, however, the system of FIG. 2C illustrates that the installed devices report back the detected speech 59 to the fire alarm panel 102 via a network interface that is different from the network interface over which the installed devices report back the generated information 39. In the illustrated example, the installed devices report back the generated information 39 over a wired network interface (e.g. detection circuit 24) and report back the detected speech 59 over a wireless network interface 44.

The installed devices can be retrofitted into an existing fire alarm system when bandwidth constraints of the system otherwise cannot support transmission of generated information 39 and detected speech 59 on the same network interface/channel as in FIG. 2A.

Each of the fire sensor devices 111/alarm notification devices 112 include an antenna 13 for communicating the detected speech 59 over the wireless network 44. The fire alarm panel 102 also includes an antenna 13 attached to a wireless interface 19, the latter of which is controlled by the panel controller 414.

Figure 3:
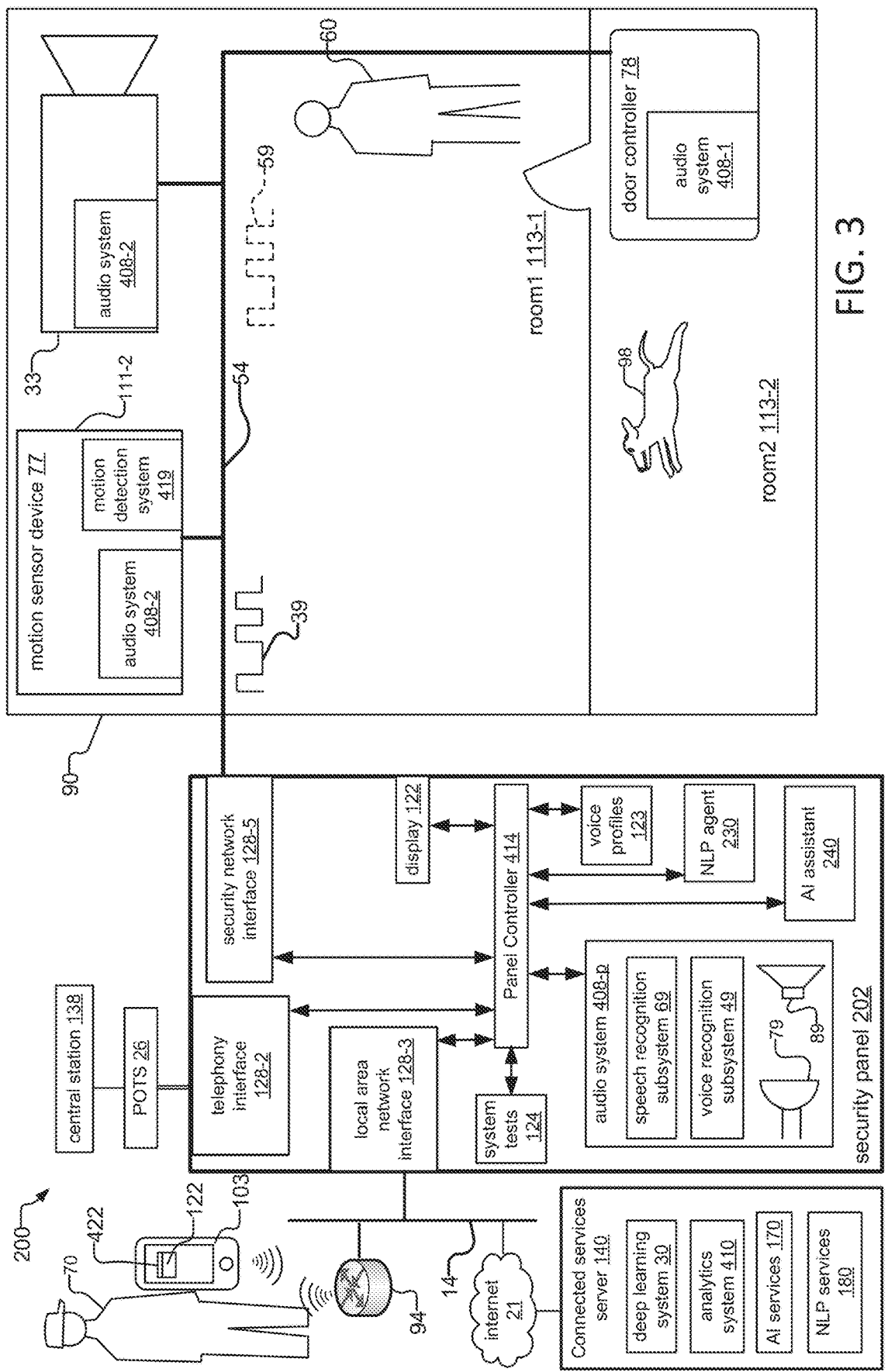
FIG. 3 is a block diagram showing an embodiment of an audio-enabled security system for a building, where the system includes audio-enabled security devices such as a motion sensor device, security camera and a door controller as installed devices that communicate with a security panel.

FIG. 3 is a block diagram showing an embodiment of an audio-enabled security system 200 as the building management system. One or more audio-enabled installed devices such as a motion sensor device 77 (a sensor 132), surveillance camera device 33 (a sensor 132), and door controller 78 (a controller 142) communicate over a security network 54 with a security panel 202 as the management system panel. The security panel 202 includes similar components as the fire alarm panel 102 of FIGS. 2A and 2B, with a notable exception being that the detection circuit interface 128-1 and notification interface 128-4 of FIG. 2A/B are replaced with a security network interface 128-5 in FIG. 3.

In the illustrated embodiment, motion sensor device 77 and surveillance camera device 33 are included in room1 113-1 and door controller 78 is included within room2 113-2. The motion sensor device 77 includes audio system 408-2 and motion detection system 419. The surveillance camera device 33 includes audio system 408-2, and the door controller 78 includes audio system 408-1.

The installed devices generate information over the security network 54 for reporting back to the security panel 202. In one example, the security network is a wired network such as CAT5 for high-speed IP based communications. The generated information 39 includes motion detected by the motion sensor device 77 and includes surveillance images detected by the surveillance camera device 33, in examples.

The installed devices can detect speech of individuals such as occupants 60 and/or technicians 70 and report back the detected speech 59 to the security network interface 128-5 of the security panel 102 via the security network 54.

Figure 4:
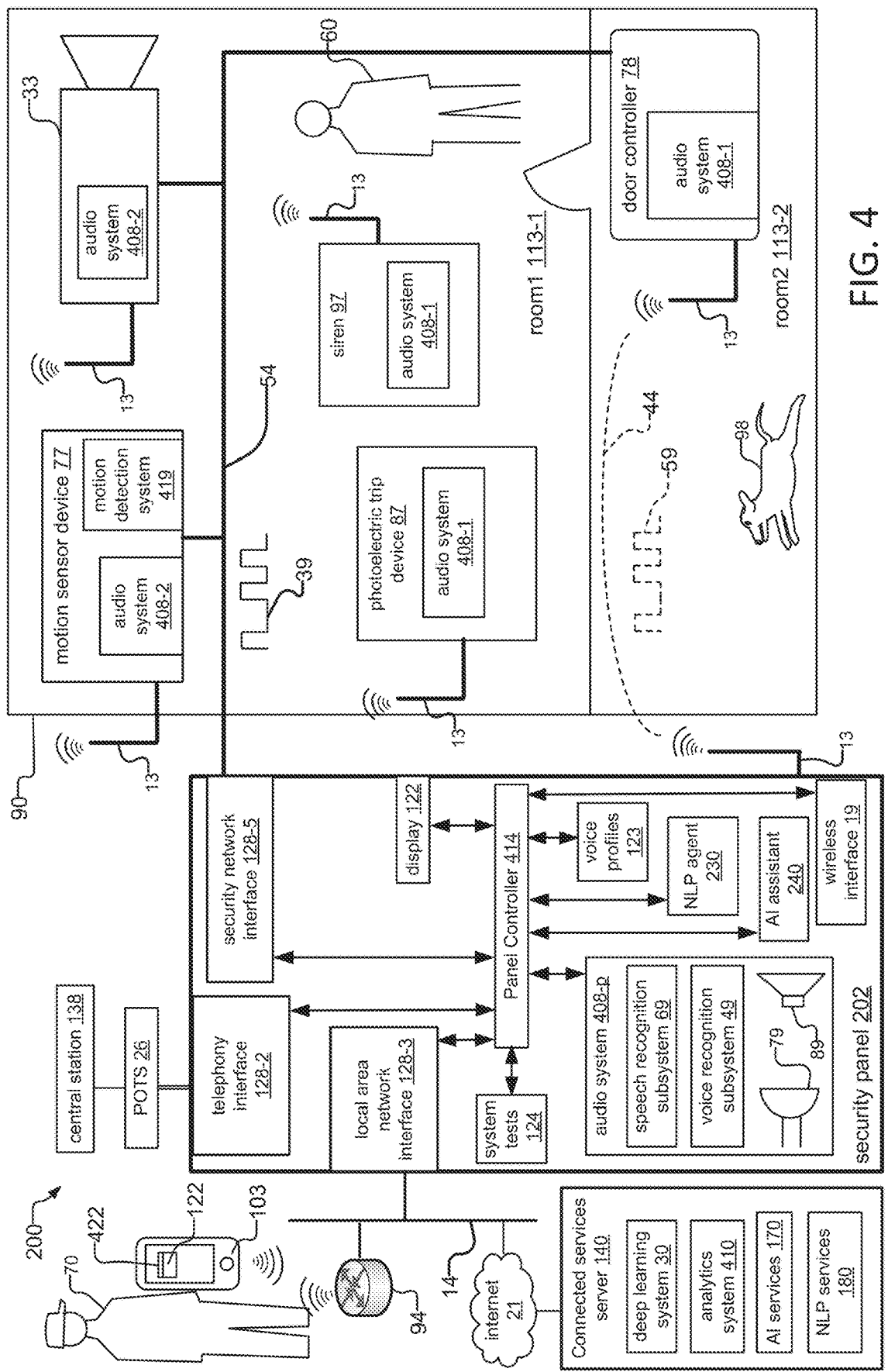
FIG. 4 is a block diagram showing another embodiment of an audio-enabled security system in which audio information is transmitted over wireless interfaces.

FIG. 4 is a block diagram showing another embodiment of an audio-enabled security system 200. The system in FIG. 4 includes similar components as in FIG. 3 and additional installed devices as compared to the system of FIG. 3. The additional installed devices include a photoelectric trip device 87 (a sensor 132) and a siren 112-1 (which is an example of a controllers 142 as shown in FIG. 1142). As in FIG. 3, each of the installed devices include an audio system 408 for detecting speech. Unlike the system of FIG. 3, however, the system of FIG. 4 illustrates that the installed devices report back the detected speech 59 to the security panel 202 via a network interface that is different from the network interface over which the installed devices report back the generated information 39. In the illustrated example, the installed devices report back the generated information 39 over a wired network (e.g. security network 54) and report back the detected speech 59 over a wireless network 44.

The installed devices can be retrofitted into an existing security system 200 when bandwidth constraints of the system otherwise cannot support transmission of generated information 39 and detected speech 59 over the same network interface/channel as in FIG. 3.

Each of the installed devices (e.g. motion sensor device 77, surveillance camera device 33, door controller 78, photoelectric trip device 87 and siren 112-1) include an antenna 13 for communicating the detected speech 59 over the wireless network 44. The security panel 202 also includes an antenna 13 attached to a wireless interface 19, the latter of which is controlled by the panel controller 414.

The installed devices can be part of a burglar alarm system that typically includes the security panel 202 and a subset of the installed devices of the security system 200. In one example, the installed devices of the burglar alarm system includes motion sensor devices 77, photoelectric trip devices 87 and a siren 122-1. The photoelectric trip device 87 and the siren 112-1 include audio system 408-1.

Figure 5:
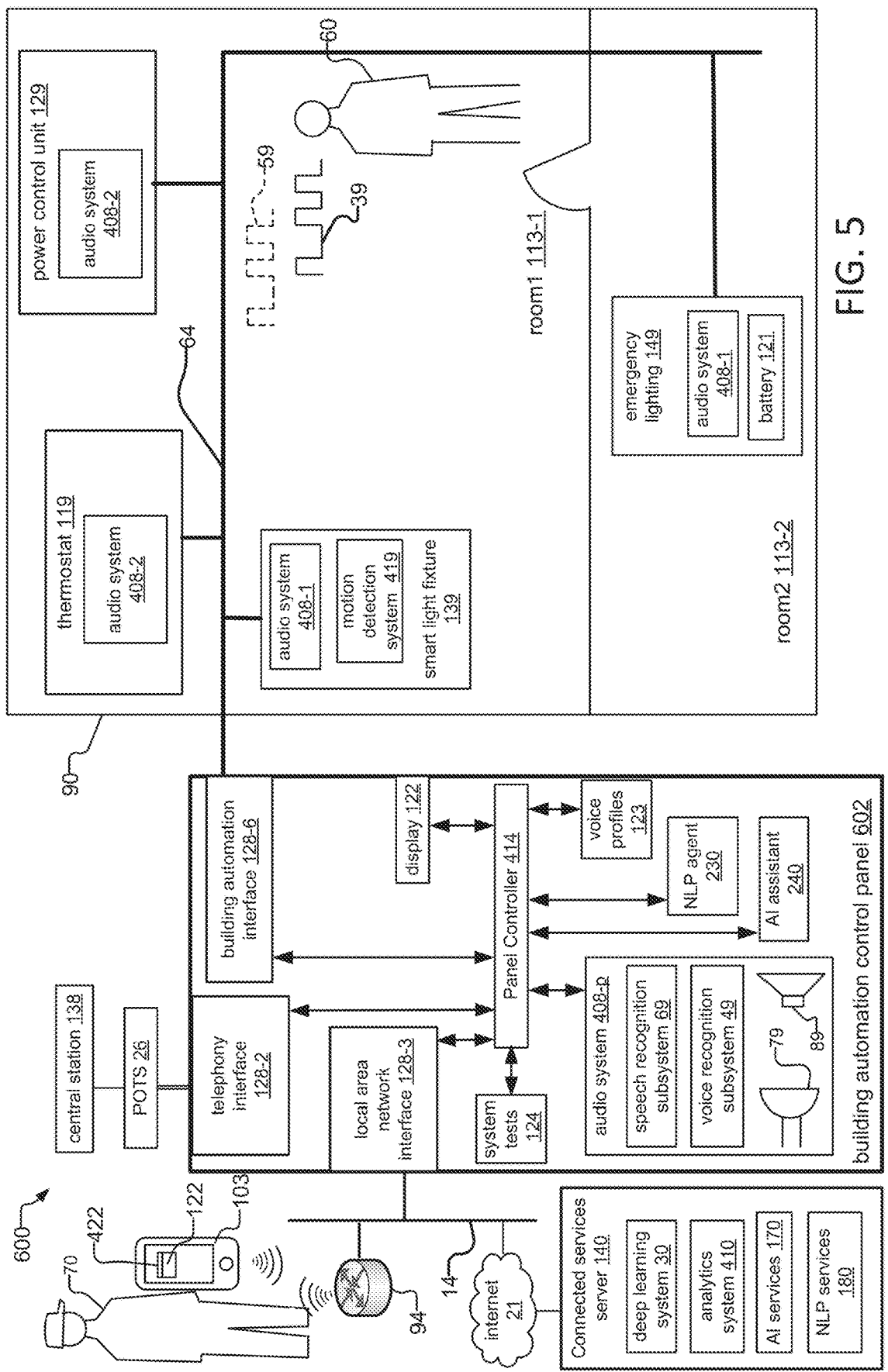
FIG. 5 is a block diagram showing an embodiment of an audio-enabled building automation system for a building, where the system includes audio-enabled building automation devices such as a thermostat, a power control unit and different examples of lighting systems as installed devices that communicate with a building automation control panel.

FIG. 5 is a block diagram showing an embodiment of an audio-enabled building automation system 600 as the building management system.

One or more audio-enabled installed devices such as a thermostat 119 (a sensor 132), power control unit 129 (a controller 142), and lighting systems such as a smart light fixture 139 (a sensor/controller 152) and emergency lighting 149 (a controller 142) communicate over a building automation network 64 with a building automation control panel 602 as the management system panel. The building automation control panel 602 includes similar components as the security alarm panel 202 of FIG. 3, with the notable exception being that the building automation control panel 602 has a building automation interface 128-6 that receives detected speech 59 from the installed devices instead of a security network interface 128-5 as in FIG. 3.

In the illustrated embodiment, thermostat 119, smart light fixture 139 and power control unit 129 are included in room1 113-1. Emergency lighting 149 is included within room2 113-2. The thermostat 119 and the power control unit 129 include audio system 408-2. The smart light fixture 139 and the emergency lighting include audio system 408-1. The emergency lighting 149 also includes a battery 121.

The smart light fixture 139 is an example of a sensor/controller 152 and includes a motion detection system 419 to detect occupants within room1 113-1. The motion detection system 419 has a motion sensor to detect occupants. In response to detecting occupants within room1 (or detecting no occupants for a predetermine time period), in one example, the smart light fixture 139 can not only turn on (turn off) its lights in response, but can send an associated message to the same effect to the building automation control panel 602. Upon receiving the message, in one example, the panel 602 can send signals to the power control unit 129, where the signals instruct the power control unit 129 to switch on/off power to computers in room1 113-1. Moreover, because the smart light fixture 139 has an integrated audio system 408-2, the smart light fixture 139 can enable or disable its lights in response to spoken commands.

The power control unit 129 is an example of a controller 142. The power control unit 129 can control the source of input power to systems within the building 90 such as computer systems, machinery, and physical plant systems. In another usage scenario, the technician 70 speaks a "power save" command into the audio system 408-p of the building automation control panel 602. In response, the panel 602 sends a signal to this effect over the building automation interface 128-6, and the signal is received by the power control unit 129. In response, the power control unit 129 sends associated signals to place the computer systems, machinery, and physical plant systems of the building 90 in a power saving mode.

The installed devices generate information over the building automation network 64 for reporting back to the building automation control panel 602. In one example, the security network is a wired network such as CAT5 for high-speed IP based communications. The generated information 39 includes motion detected by the motion sensor device 77 and includes surveillance images detected by the surveillance camera device 33, in examples.

The installed devices can detect speech of individuals such as occupants 60 and/or technicians 70 and report back the detected speech 59 to the building automation control panel 602 via the building automation network 64.

Figure 6A:
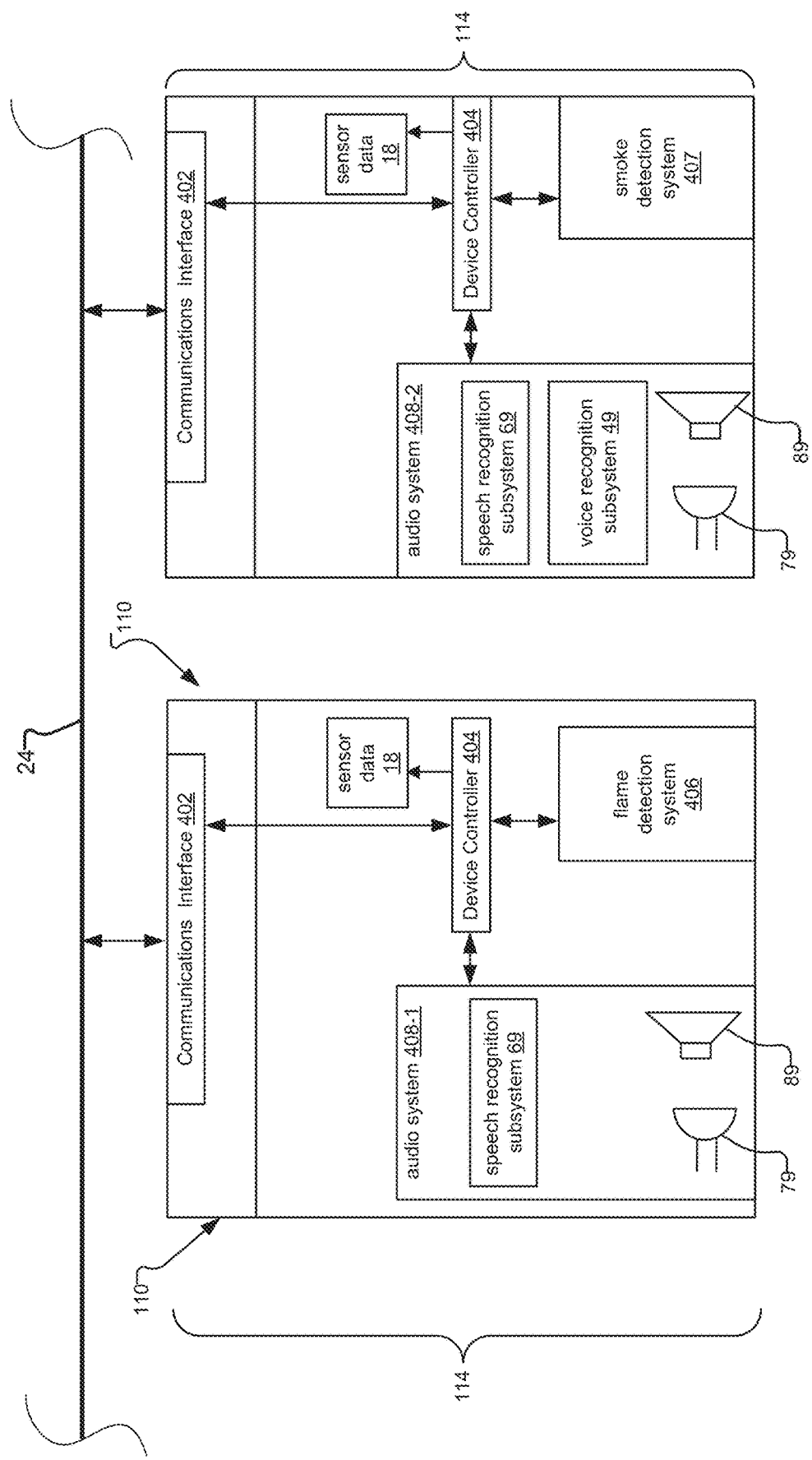
FIG. 6A is a schematic diagram showing embodiments of audio-enabled fire sensor devices for use in the fire alarm system of FIG. 2A.

FIG. 6A shows detail for the fire alarm system 100 of FIG. 2A. Here, exemplary flame fire sensor device 111-3 and smoke fire sensor device 111-4 are connected to detector circuit 24, which in turn connects to the detector circuit interface 128-1 of the fire alarm panel 102. Fire sensor devices 111-3 and 111-4 send both generated information 39 and detected speech 59 over the detection circuit 24.

Common components among the fire sensor devices 111-3 and 111-4 include a housing 114 and a base 110 of the housing 110. The base 110 enables mounting of the fire sensor devices 111-3 and 111-4 to a surface, such as on a ceiling within rooms 113 of a building 90. The base 110 includes a communications interface 402 that enables communications between the fire sensor devices 111 and the detector circuit 24. The communications interface 402 is preferably located on or within the housing 114 for communicating with the fire alarm panel 102. A device controller 404 located within the housing 114 enables communications between the communications interface 402 and other components within the housing 114. The housing 114 also includes sensor data memory and an audio detection system 408.

Flame fire sensor device 111-3 additionally includes a flame detection system 406 and audio system 408-1. The flame detection system 406 includes one or more sensors such as optical, ultraviolet, and/or infrared sensors that enable the flame detection system 406 to detect flame as an indication of fire. Audio system 408-1 includes an audio transducer 30 (here, a microphone) or similar sound transduction detection system, a speaker 79, and a speech recognition subsystem 69. The audio system 408-1 further includes an analog to digital converter to convert the detected sound to digital audio information.

Smoke fire sensor device 111-4 additionally includes a smoke detection system 407 and audio system 408-2. The smoke detection system 407, in turn, includes one or more sensors such as a photoelectric sensor that enables the smoke detection system 407 to detect smoke as an indication of fire. Audio system 408-2 includes an audio transducer 30 or similar sound transduction detection system, a speaker 79, a speech recognition subsystem 69, and a voice recognition subsystem 49. The audio system 408-2 further includes an analog to digital converter to convert the detected sound to digital audio information.

The fire sensor devices 111 store and reference information within sensor data memory 18 of the fire sensor devices 111. In general, the memory 18 is typically random access memory such as volatile or nonvolatile memory.

An example scenario is described below that illustrates operation of the fire sensor devices 111-3 and 111-4 during a fire condition 80 in the building 90.

First, flame fire sensor device 111-3 detects an indication of fire in room 1 113-1 via its flame detection system 406. The flame detection system 406 saves the indication of fire to the sensor data memory 18 and generates information 39 associated with the indication of fire for reporting back to the fire alarm panel 102 via the communications interface 402. The fire alarm panel 102 generates a fire alarm signal in response over its detection and notification circuits 24/34 and fire sensor device 111-3 receives the fire alarm signal over its communications interface 402.

The audio system 408-1 of flame fire sensor device 1 11-3 also detects audio information such as ambient noise within the premises and speech of occupants, i.e. detected speech 59. The audio detection system 408-1, in one example, continuously captures the audio information and stores the information in a ring buffer in memory 18, so that the audio system 408-1 always has stored audio information for a predetermined history of 10 minutes or more, for example, preceding the receipt of the alarm signal. Via the speech recognition subsystem 69, the audio system 408-1 can detect speech of occupants 60 in the building. In one example, the speech recognition subsystem 69 uses natural language processing algorithms.

In one example, the speech recognition subsystem 69 can recognize speech of a person and match it to lists of local and remote commands. The commands can initiate operations upon the fire alarm panel 102 and its installed devices, such as to obtain status for the installed devices and the fire alarm panel 102 and to test and control the fire alarm panel 102 and its devices, in examples. The speech recognition subsystem 69 can also forward the detected speech 59 and/or any sounds that it cannot match to speech to the fire alarm panel 102 for further analysis. In this way, the fire alarm panel 102 as the management system panel can analyze the detected speech 59 for commands, such as from a technician concerning a test of the fire alarm system 100 as the building management system.

Turning now to smoke fire sensor device 111-4, in response to receiving the alarm signal generated by the fire alarm panel 102 over the communications interface 402, in one example, the device controller 404 instructs the audio system 408-2 to capture sound and detect speech of occupants 60. In another example, the audio system 408-2 continuously monitors for sound such as speech independently of the fire alarm panel 102 (e.g. without requiring an alarm signal sent from the fire alarm panel 102 as a trigger for the audio system 408 to initiate speech detection). Upon detecting speech, the detected speech 59 is stored in ring buffer in memory 18.

Then, the voice recognition system 49 of audio system 408-2 can analyze the detected speech 59 to identify the speaker (e.g. occupant 60) that issued the detected speech 59. For this purpose, in one example, the voice recognition system 49 can maintain a list of voice patterns of known and/or pre-authorized individuals, and compare the detected speech 59 to the patterns. In another example, the fire sensor device 111-4 can send the detected speech 59 to the fire alarm panel 102. The fire alarm panel 102 can then analyze the detected speech 59 and perform voice recognition against a list of known speakers to identify the speaker, in one implementation.

Figure 6B:
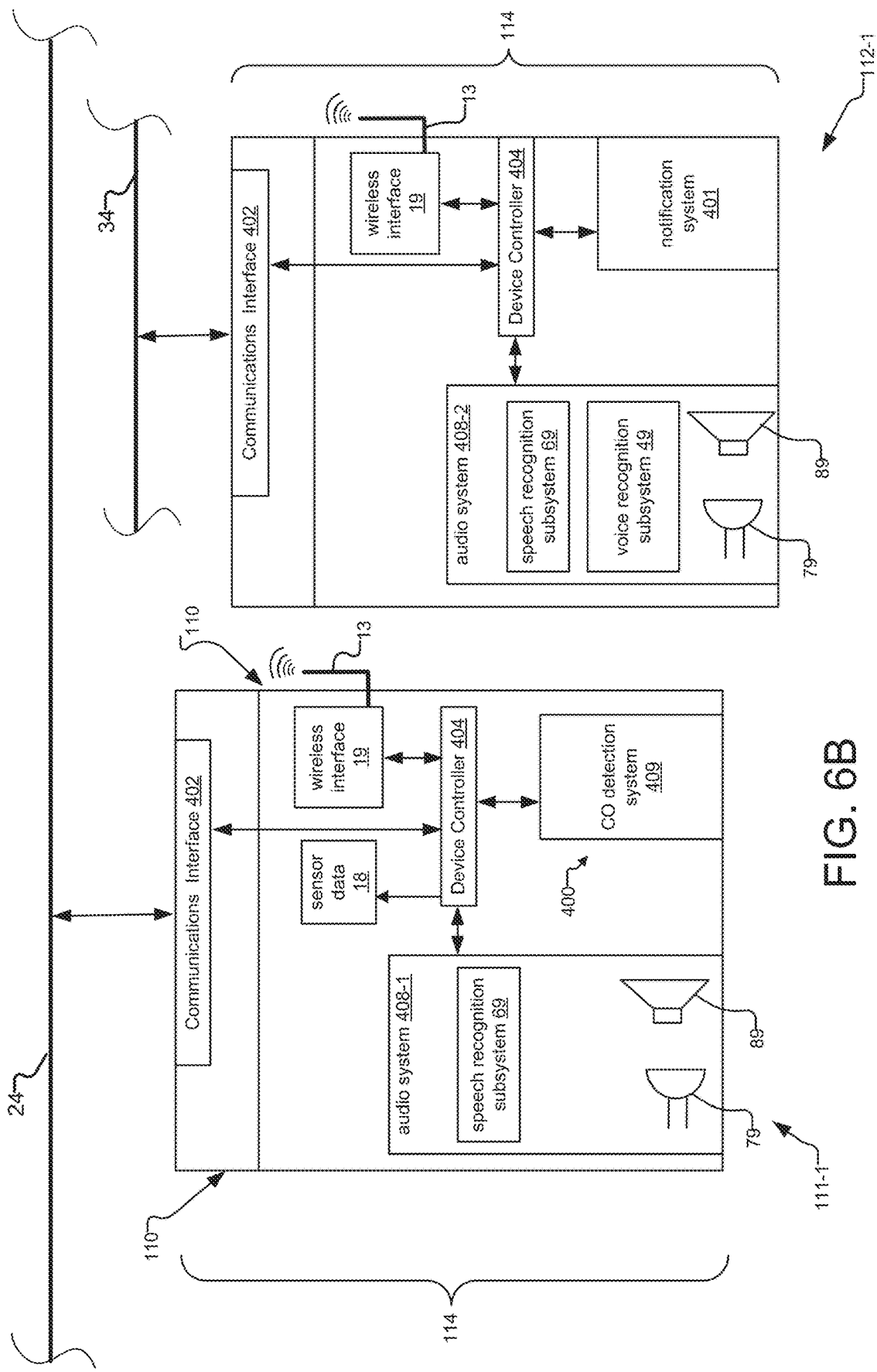
FIG. 6B is a schematic diagram showing embodiments of a fire sensor device and an alarm notification device for use in the fire alarm system of FIG. 2C.

FIG. 6B shows more detail for the fire alarm system 100 of FIG. 2C. Different examples of a CO fire sensor device 111-1 and a siren notification device 112-1 are shown.

In the illustrated example, both the fire sensor device 111-1 and the notification device 112-1 have wireless interfaces 19 that are controlled by their respective device controllers 404. The fire sensor device 111-1 includes audio system 408-1 while notification device 112-1 includes audio system 408-2, where the audio systems 408-1/408-2 were previously described in detail within the description of FIG. 6A hereinabove.

Unlike the audio systems 408 of the fire sensor devices 111 in FIG. 6A, the audio system 408-1 of CO fire sensor device 111-1 and the audio system 408-2 of siren alarm notification device 112-1 use a different network interface for communicating the detected speech 59 to the fire alarm panel 102 than for communicating the generated information 39. Specifically, CO fire sensor device 111-1 reports back the generated information 39 via a wired network interface (e.g. the detection circuit 24) and reports back the detected speech 59 via a different interface (e.g. wireless interface 19/wireless connection 44). Similarly, siren alarm notification device 112-1 reports back the generated information 39 via a wired network interface (e.g. the notification circuit 34) and reports back the detected speech 59 via a different interface (e.g. wireless interface 19/wireless connection 44).

Figure 6C:
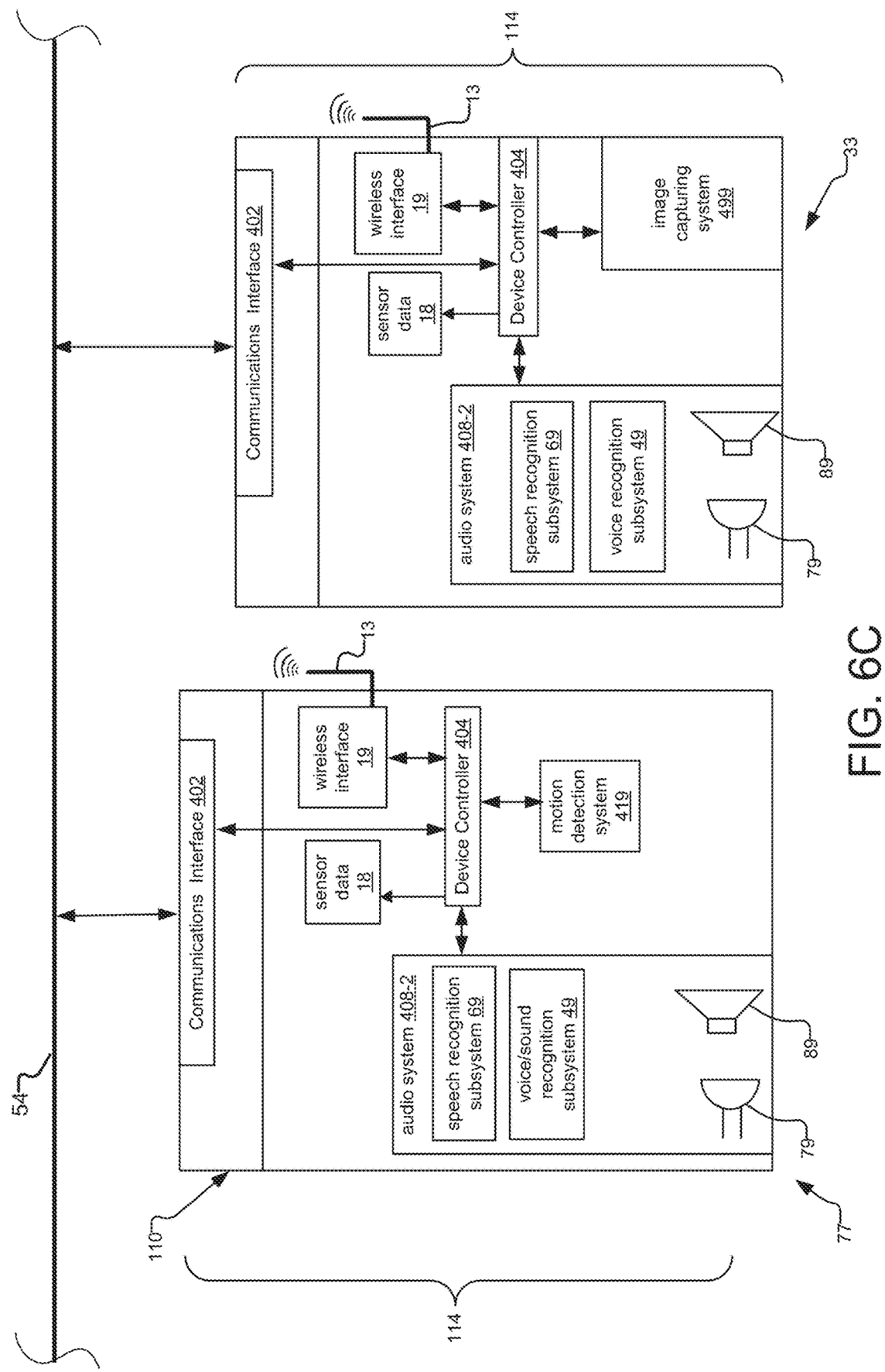
FIG. 6C is a schematic diagram showing embodiments of a motion sensor device and a surveillance camera device for use in the security system of FIG. 4.

FIG. 6C shows more detail for the security system 200 of FIG. 4. Motion sensor device 77 and surveillance camera device 33 both have wireless interfaces 19 and include audio system 408-2, the latter of which was described in detail with respect to the description of FIG. 6A hereinabove. Surveillance camera device 33 also includes sensor data 18, a device controller 404, and an image capturing system 499. Motion detection device 77 also includes sensor data 18, a device controller 404, and a motion detection system 419.

As with the installed devices in FIG. 6A and FIG. 6B for the fire alarm system 100, the installed devices in FIG. 6C for the security system 200 store and reference information within sensor data memory 18. In general, the memory 18 is typically random access memory such as volatile or non-volatile memory.

The surveillance camera device 33 can buffer its detected surveillance images to sensor data memory 18 before transmitting the images as generated information 33 over the security network 54 to the security panel 202. In a similar fashion, the motion sensor device 77 can store information concerning detected motion as generated information 33 before transmitting the generated information 33 over the security network 54 to the security panel 202.

As with the audio systems 408 of the fire sensor devices 111/alarm notification devices 112 of FIG. 6B, the audio systems 408-2 of motion sensor device 77 and surveillance camera device 33 use a different network interface for communicating the detected speech 59 to its management control panel (here, the security control panel 202) than for communicating the generated information 39. Specifically, motion sensor device 77 reports back the generated information 39 via a wired network interface (e.g. the security network 54) and reports back the detected speech 59 via a different interface (e.g. wireless interface 19/wireless connection 44). Similarly, surveillance camera device 33 reports back the generated information 39 via a wired network interface (e.g. the security network 54) and reports back the detected speech 59 via a different interface (e.g. wireless interface 19/wireless connection 44).

Figure 7:
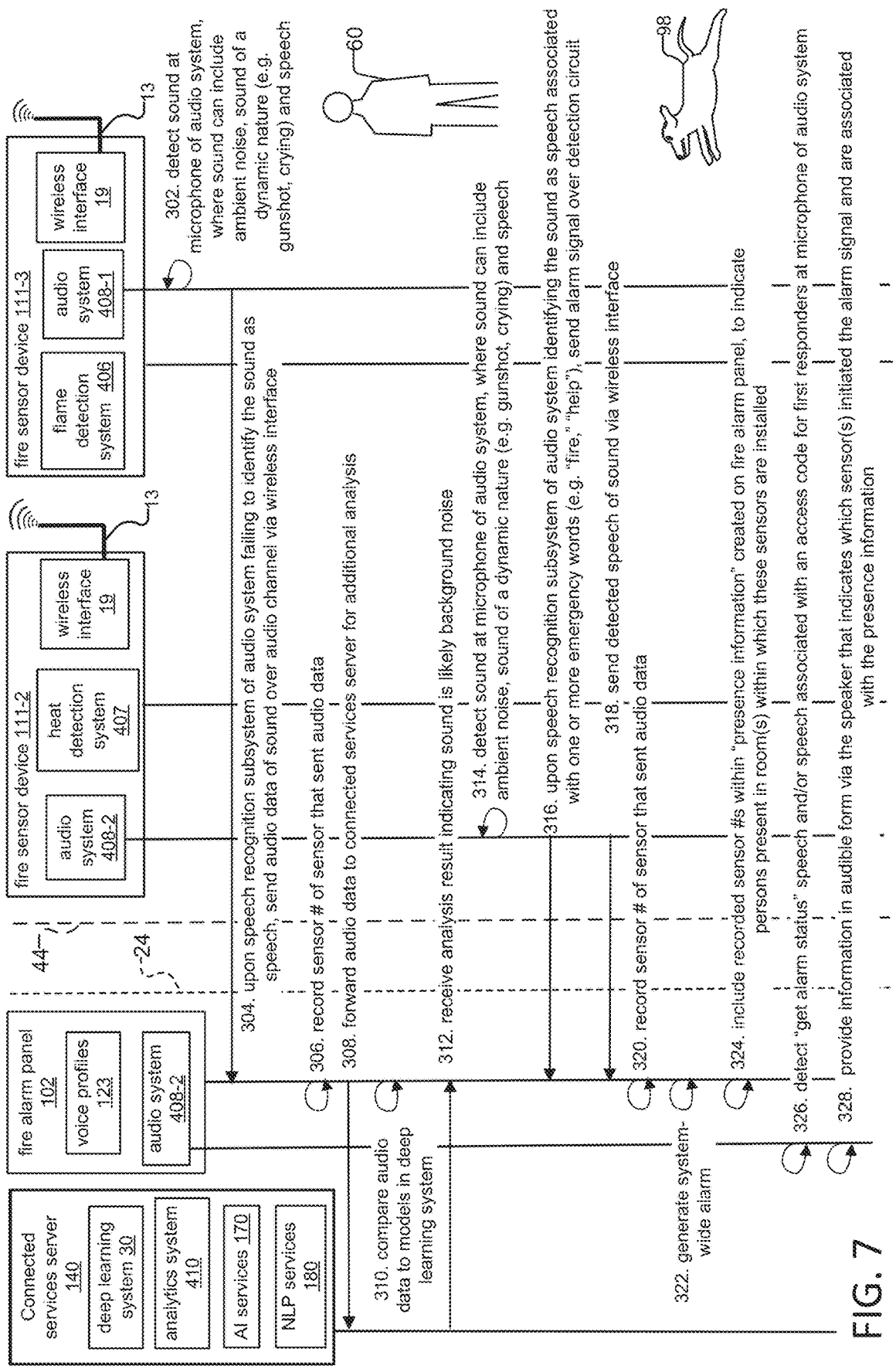
FIG. 7 is a sequence diagram showing how the audio enabled fire alarm system of FIG. 2C can detect the presence of individuals in a room of a building via sound and/or speech detected by audio systems of the fire sensor devices and alarm notification devices.

FIG. 7 is a sequence diagram showing one example of how the audio enabled fire alarm system 100 of FIG. 2C can detect the presence of individuals/occupants 60 in a room 113 via sound and/or speech detected by the audio systems 408 of the fire sensor devices 111.

In step 302, fire sensor device 111-3 detects sound at a microphone 79 of its audio system 408-1, where the sound can include ambient noise, sound of a dynamic nature (e.g. gunshot, crying) and speech of an occupant 60, in examples. According to step 304, upon the speech recognition subsystem 69 of audio system 408-1 failing to identify the sound as speech, the audio system 408-1 sends audio data of the sound via wireless interface 19 to the fire alarm panel 102.

In step 306, the fire alarm panel 102 receives the audio data via its wireless interface 19 and records the sensor # of the sensor that sent the audio data. Then, in step 308, the fire alarm panel 102 analyzes the audio data and/or forwards the audio data via the LAN 14 and the internet 21 to the connected services server 140 for additional analysis. The connected services server 140 compares the audio data to models in its deep learning system 30 and sends the result of the analysis back to the fire alarm panel 102 in step 310.

Additionally, the NLP agent 230 can also process the audio against locally maintained commands. Any matching commands can also be passed to the AI assistant 240. The AI assistant 240, in turn, executes the matching local commands directly upon local resources and/or components of the panel 12, and/or sends the matching remote commands for execution by the AI services 170. The AI services 170 can then execute actions as required.

In step 312, the fire alarm panel 102 generates an analysis result or receives the analysis result from the connected services server 140, which indicates the sound is likely background noise. Because this is not associated with an emergency condition, no further action is executed upon or in response to the audio data and the fire sensor devices 111 continue to monitor for sounds such as speech.

Then, in step 314, fire sensor device 111-2 detects sound at microphone 79 of its audio system 408-2, where sound can include ambient noise, sound of a dynamic nature (e.g. gunshot, crying) and speech, in examples.

According to step 316, upon the speech recognition subsystem 69 of the audio system 408 of fire sensor device 111-2 identifying the sound as speech associated with one or more emergency words (e.g. "fire," "help"), fire sensor device 111-2 sends an alarm signal or other indication of emergency as generated information 39 over the detection circuit 24 to the fire alarm panel 102.

In some examples, speech from first responders is detected enabling tracking firemen for instance saying "front room clear" and similar information.

On the other hand, other sounds like a dog barking can be detected. For instance, in a fire, while motion detection may occur with respect to a room but a dog barking is also detected, then different priorities can be set with respect to other rooms where human sounds are detected, like "help."

In step 318, the fire sensor device 111-2 also sends detected speech 59 of the sound via wireless interface 19 to the fire alarm panel 102. In step 320, the fire alarm panel 102 records the sensor # of sensor that sent the detected speech 59 and generates a system-wide alarm signal in step 322. The system-wide alarm signal is preferably sent over both the detection circuit 24 and the notification circuit 34. As a result, the fire alarm panel 102 as an example of a management system panel can generate building alarms in response to the detected speech 59.

In step 324, the fire alarm panel 102 includes the recorded sensor # s within "presence information" created on the fire alarm panel 102, to indicate persons present in room(s) within which the fire sensor devices 111 are installed. In one example, the fire alarm panel 102 analyzes the detected speech 59 from the installed devices (here, fire sensor devices 111) and maintains counts of occupants 60 in the rooms 113 of the building 90.

First responders then arrive at the building 90 and access the fire alarm panel 102 via speech commands. According to step 326, the fire alarm panel 102 detects a "get alarm status" speech command and/or speech associated with an access code for first responders at the microphone 79 of its audio system 408-p. In step 328, in response, the fire alarm panel 102 provides information in audible form via the speaker 89 of audio system 408-p that indicates which fire sensor device(s) 111 initiated the alarm signal and are associated with the presence information, in examples. The fire alarm panel 102 stores the presence information for individuals determined to be located in rooms 113 within which the fire sensor devices 111 are installed, where the presence information is inferred via detected speech 59 and/or sounds detected within the rooms 113 by the fire sensor devices 111 and/or alarm notification devices 112.

In this way, first responders can issue spoken commands upon the fire alarm panel 102 to obtain an audible status of an alarm event and the presence information. It is also important to note that in response to the spoken commands, the fire alarm panel 102 can also provide status as to the alarm event and can present the presence information on the display screen 122 and/or to applications 422 on mobile devices 103 carried by first responders, in examples.

Figure 8A:
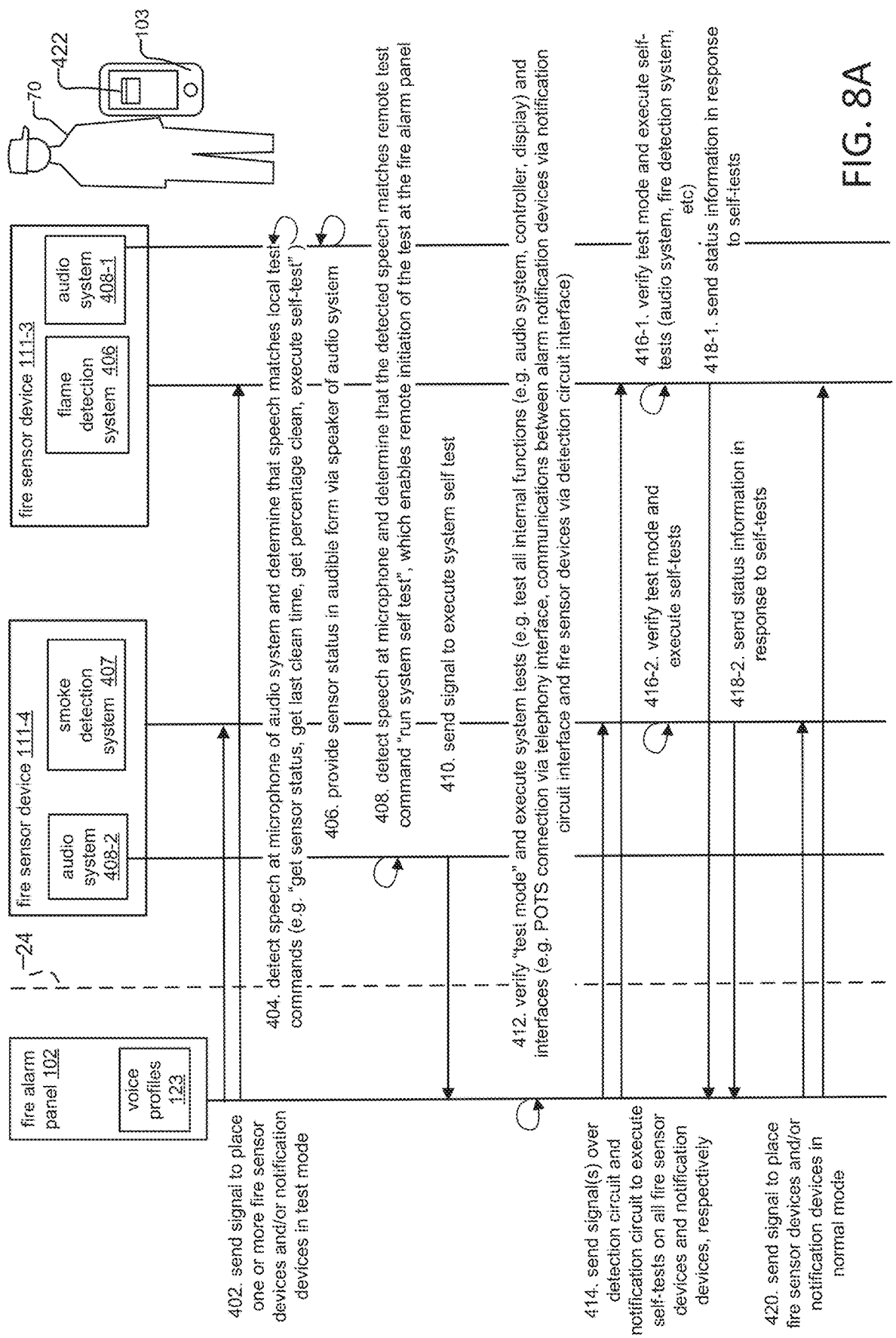
FIG. 8A is a sequence diagram showing one example for how technicians can issue commands via audio enabled fire sensor devices for testing the fire alarm systems of FIGS. 2A, 2B, and 2C and the components of these systems.

FIG. 8A is a sequence diagram showing one example for how technicians 70 can issue spoken commands for testing the fire alarm system 100 and its components. After the fire alarm panel 102 is first placed in a "test mode" by an administrator, a technician 70 can issue audio commands via the audio systems 408 of the fire alarm sensors 111, alarm notification devices 112, or the fire alarm panel 102. The commands can be local in nature to each installed device or can specify execution of remote commands upon the fire alarm panel 102, such as a full system self-test.

In step 402, an administrator sends a signal via the fire alarm panel 102 to place the system and its installed devices into a "test mode." A technician 70 then approaches the first installed device to test, here fire sensor device 111-3.

According to step 404, fire sensor device 111-3 detects speech at the microphone 79 of its audio system 408-1 and determines that the speech matches local test commands (e.g. "get sensor status, get last clean time, get percentage clean, execute self-test"). In the illustrated example, the command is "get sensor status." In response, in step 406, audio system 408-1 provide sensor status in audible form via the speaker 89 of the audio system 408-1.

The technician 70 then approaches fire sensor device 111-4. In step 408, fire sensor device 111-4 detects speech at the microphone 79 of the audio system 408-2 and determines that the detected speech 59 matches remote test command "run system self test", which enables remote initiation of a full test of the fire alarm system 100 at the fire alarm panel 102. In response, the fire sensor device 111-4 sends a signal over the detection circuit 24 to execute the system self-test in step 410.

In step 412, the fire alarm panel 102 verifies that it is currently in "test mode" and executes its system tests 124. These can include tests of all internal functions of the fire alarm panel 102 (e.g. audio system 408-p, panel controller 414, display 122) and its interfaces 128. In examples, interface testing includes testing of: the POTS 26 connection via telephony interface 128-2 to the central office, communications between the fire alarm panel 102 and the alarm notification devices 112 via the notification circuit interface 34, and communications between the fire alarm panel 102 and the fire sensor devices 111 via the detection circuit interface 24. At one point during execution of the system tests 124, according to step 414, the fire alarm panel 102 send signal(s) over detection circuit 24 to execute self-tests on all fire sensor devices 111 and over notification circuit 24 to execute self-tests on all alarm notification devices 112. In the illustrated example, only fire sensor devices 111 are shown.

In step 416-1, fire sensor device 111-3 receives the signal to execute a self-test. In response, fire sensor device 111-3 verifies that the fire alarm panel 102 is in "test mode" and execute self-tests (e.g. upon its audio system, 408-1 flame detection system 406, in examples). In a similar fashion, in step 416-2, fire sensor device 111-4 receives the signal to execute a self-test. In response, fire sensor device 111-3 verifies that that the fire alarm panel 102 is in "test mode" and execute its self-tests.

Upon completion of the self-tests, in step 418-1, the fire sensor device 111-3 sends status information in response to execution of the self-tests over the detection circuit 24 to the fire alarm panel 102. In a similar fashion, fire sensor device 111-4 sends status information in response to execution of its self-tests over the detection circuit 24 to the fire alarm panel 102 in step 418-2. Finally, in step 420, the fire alarm panel 102 sends a signal to place the fire sensor devices 111 and/or notification devices 112 in "normal mode" to resume normal operation.

Additionally, speech from the technicians can also be recorded and interpreted at the conclusion of the test such as "detector 21 service complete" and a log created of all completed services.

Figure 8B:
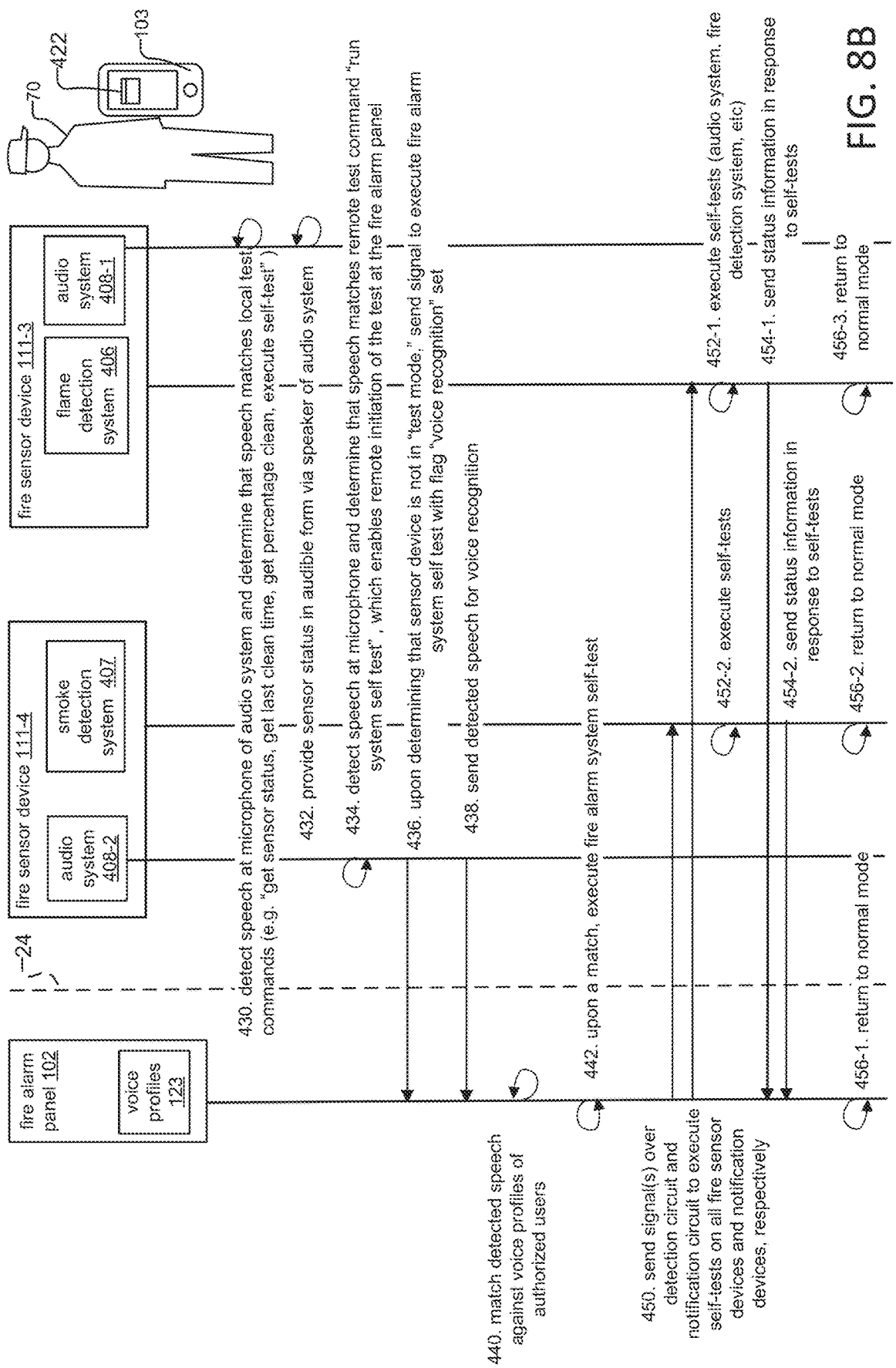
FIG. 8B is a sequence diagram showing another example for how technicians can issue commands via the audio enabled fire sensor devices for testing the fire alarm system and its components.

FIG. 8B is a sequence diagram showing another example for how technicians 70 can issue spoken commands for testing the fire alarm system 100 and its components. Here, the fire alarm panel 102 can be remotely placed in a "test mode" based on voice recognition of the speech commands to verify that the individual issuing the commands is a user that is authorized to issue the commands. This ensures that random and/or unauthorized individuals cannot tamper with the fire alarm panel 102 and/or access the testing features of the fire alarm system 100 system and its installed devices via speech commands.

In step 430, fire sensor device 111-3 detects speech at the microphone 79 of its audio system 408-1 and determines that the speech matches local test commands (e.g. "get sensor status, get last clean time, get percentage clean, execute self-test"). In the illustrated example, the command is "get sensor status." In response, in step 432, audio system 408-1 provide sensor status in audible form via the speaker 89 of the audio system 408-1.

The technician 70 then approaches fire sensor device 111-4. In step 434, fire sensor device 111-4 detects speech at the microphone 79 of the audio system 408-2 and determines that the detected speech 59 matches remote test command "run system self test", which enables remote initiation of a full test of the fire alarm system 100 at the fire alarm panel 102. In response, fire sensor device 111-4 sends a signal/message to execute the system self-test upon the fire alarm panel in step 436. Because the command identified in the detected speech 59 requires authentication of the speaker that issued the command, the fire sensor device 111-4 sets a "voice recognition" flag within the message. Then, in step 438, the fire sensor device 111-4 sends the detected speech 59 to the fire alarm panel 102 for voice recognition.

In step 440, the fire alarm panel 102 receives the signal and the detected speech 59, and matches the detected speech 59 against voice profiles 123 of authorized users. In step 442, upon finding a match, the fire alarm panel 102 executes its system tests 124. The system tests 124 include the tests previously described in step 412 of FIG. 8A.

At one point during execution of the system tests 124, according to step 450, the fire alarm panel 102 send signal(s) over detection circuit 24 to execute self-tests on all fire sensor devices 111 and over notification circuit 24 to execute self-tests on all alarm notification devices 112. In the illustrated example, only fire sensor devices 111 are shown.

In step 452-1, fire sensor device 111-3 receives the signal to execute a self-test and carries out the self-tests. In a similar fashion, in step 452-2, fire sensor device 111-4 receives the signal to execute its self-tests and carries out the self-tests.

Upon completion of the self-tests, in step 452-1, the fire sensor device 111-3 sends status information in response to execution of the self-tests over the detection circuit 24 to the fire alarm panel 102. In a similar fashion, fire sensor device 111-4 sends status information in response to execution of its self-tests over the detection circuit 24 to the fire alarm panel 102 in step 452-2. The fire alarm panel 102, fire sensor device 111-3, and fire sensor device 111-4 then return to normal operation mode according to steps 456-1 through 456-3, respectively.

It can also be appreciated that speech commands detected by installed devices within a security system 200 can be utilized to control and test the security system 200 and its installed devices in a manner similar to that described in FIGS. 8A and 8B for the fire alarm system 100.

FIG. 9 is a sequence diagram showing a "soft access control" ability associated with the audio-enabled security system of FIG. 4, where the system can determine that a controlled area includes only authorized users based on voice recognition of the individuals in the room. Upon determining that the individuals are unauthorized, the system can track the individual via a surveillance camera device 33 and forward surveillance video data of the individual for further analysis via an analytics system 410 and/or external crime databases, in examples.

In step 502, audio system 408-2 of motion sensor device 77 detects sound at its microphone 79, where sound can include ambient noise, sound of a dynamic nature (e.g. gunshot, crying) and speech, in examples. In step 504, upon the speech recognition subsystem 69 of motion sensor device 77 identifying the sound as speech, the motion sensor device 77 sends the detected speech 59 via its wireless interface 19 to the security alarm panel 202 for voice recognition processing of the detected speech 59.

In step 506, the security panel 202 records the sensor # or ID of the installed device that sent the detected speech 59. In one example, the detected speech 59 can also include a flag that indicates the room within which the installed device is installed. In another example, the security panel 202 can execute a lookup of the sensor ID against a security map that includes the locations of all installed devices within the building. Using the room number 113, the security panel 202 can execute a lookup of a master access control list that includes the sensor IDs within each room 113 and user information of users that are authorized to access each room during different times. The user information can include voice profiles 123 for each user, in one example.

According to step 508, the security panel 202 matches the detected speech 59 against voice profiles 123 of authorized users for specific locations such as for individual rooms 113 within the building 90. Then, in step 510, if the security panel 202 determines that the detected speech 59 does not match any of the voice profiles 123 for authorized users, the security panel 202 sends a signal to a surveillance camera device 33 located within the room within which the speech was detected to track the individual. Additionally, in step 512, the security panel 202 forwards the detected speech 59 for further analysis by the connected services server 140.

Additionally, the NLP agent 230 can also process the audio against locally maintained commands. Any matching commands can be passed to the AI assistant 240. The AI assistant 240, in turn, executes the matching local commands directly upon local resources and/or components of the panel 12, and/or sends the matching remote commands for execution by the AI services 170. The AI services 170 can then execute actions as required.

In step 514, the surveillance camera device 33 sends surveillance images captured of the unauthorized individual to the security panel 202, which in turn forwards the surveillance images to the connected services server 140 for further analysis. According to step 518, the connected services server 140 (e.g. via its analytics system 410, in one example) compares the surveillance images against databases that include images of former employees and known "bad actor" individuals.

In a similar fashion, the connected services server 140 (e.g. via its deep learning system 30, in one example) compares the detected speech images against databases that include voice profiles 123 of former employees and known "bad actor" individuals. Additionally or optionally, the security panel 202 can forward the detected speech 59 and/or surveillance images of the individual for lookup against external crime and police databases.

While this invention has been particularly shown and described with references to preferred embodiments thereof, it will be understood by those skilled in the art that various changes in form and details may be made therein without departing from the scope of the invention encompassed by the appended claims.

What is claimed is:

1. A building management system, comprising:
    installed devices deployed in a building that generate information, the installed devices including audio transducers for detecting speech from building occupants; and
    a management system panel that processes the information from the installed devices and processes the detected speech from the occupants;
    wherein the installed devices report back the generated information via a wired network interface and report back the detected speech via a wireless network interface.

2. A building management system as claimed in claim 1, wherein the installed devices include fire sensor devices, including smoke detection systems, manual alarm signaling devices and alarm notification devices, and the management system panel is a fire alarm panel.

3. A building management system as claimed in claim 2, wherein the generated information includes the detection of smoke, heat, and/or flames.

4. A building management system as claimed in claim 1, wherein the installed devices include motion sensor devices, surveillance camera devices, and/or door controller devices, and the management system panel is a security panel.

5. A building management system as claimed in claim 4, wherein the generated information includes detected motion and detected surveillance images.

6. A building management system as claimed in claim 1, wherein the installed devices include thermostats, lighting systems, and power control units, and the management system panel is a building automation control panel.

7. A building management system as claimed in claim 1, wherein the management system utilizes artificial Intelligence and machine learning to process information received from the installed devices to adapt to changing situations and learn as the building use changes.

8. A building management system as claimed in claim 1, wherein the management system panel comprises an audio system including a speech recognition subsystem and a voice recognition subsystem.

9. A building management system as claimed in claim 1, wherein the management system panel analyzes the detected speech from the installed devices and maintains presence information indicating rooms of the building containing occupants.

10. A building management system as claimed in claim 9, wherein the management system panel analyzes the detected speech from the installed devices and maintains counts of occupants in the rooms of the building.

11. A building management system as claimed in claim 1, wherein the management system panel generates building alarms in response to the detected speech.

12. A building management system as claimed in claim 1, wherein the management system panel analyzes the detected speech for commands from a technician concerning a test of the building management system.

13. A building management system as claimed in claim 1, wherein the management system panel analyzes the detected speech and performs voice recognition against a list of known speakers to identify the speaker.

14. A method of operation of a building management system, the method comprising:
    generating information at installed devices for the building management system;
    detecting speech of building occupants at the installed devices via audio transducers;
    processing the information from the installed devices at a management system panel of the building management system;
    processing the detected speech from the occupants at the management system panel; and
    the installed devices reporting back the generated information to the building management panel via a wired network interface and reporting back the detected speech via a wireless network.

15. A method as claimed in claim 14, wherein the installed devices include fire sensor devices and alarm notification devices, and the management system panel is a fire alarm panel.

16. A method as claimed in claim 15, wherein the generated information includes the detection of smoke, heat, and/or flames.

17. A method as claimed in claim 14, wherein the installed devices include motion sensor devices, surveillance camera devices, and/or door controller devices, and the management system panel is a security panel.

18. A method as claimed in claim 17, wherein the generated information includes detected motion and detected surveillance images.

19. A method as claimed in claim 16, further comprising the building management system panel communicates detected speech to a remote connected services server.

20. A method as claimed in claim 14, further comprising the management system panel analyzing the detected speech from the installed devices and maintaining presence information indicating rooms of the building containing occupants.

21. A method as claimed in claim 14, further comprising the management system panel analyzing the detected speech from the installed devices and maintaining counts of occupants in the rooms of the building.

22. A method as claimed in claim 14, further comprising the management system panel generating building alarms in response to the detected speech.

23. A method as claimed in claim 14, further comprising the management system panel analyzing the detected speech for commands from a technician concerning a test of the building management system.

24. A method as claimed in claim 14, further comprising the management system panel analyzing the detected speech and performing voice recognition against a list of known speakers to identify the speaker.

25. A building automation system, comprising:
- installed devices deployed in a building that generate information, the installed devices including audio transducers for detecting speech from building occupants; and
- a management system panel that processes the information from the installed devices and processes the detected speech from the occupants;
- wherein the management system applies artificial intelligence and machine learning to information received from the installed devices to adapt to changing situations and learn as the building use changes.

* * * * *